(12) United States Patent
Law et al.

(10) Patent No.: US 12,422,901 B2
(45) Date of Patent: *Sep. 23, 2025

(54) SMART FUNCTIONALITY FOR DISCRETE FIELD DEVICES AND SIGNALS

(71) Applicant: FISHER-ROSEMOUNT SYSTEMS, INC., Round Rock, TX (US)

(72) Inventors: Gary K. Law, Georgetown, TX (US); Kent A. Burr, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 177 days.

This patent is subject to a terminal disclaimer.

(21) Appl. No.: 18/076,088

(22) Filed: Dec. 6, 2022

(65) Prior Publication Data

US 2023/0111740 A1     Apr. 13, 2023

Related U.S. Application Data

(62) Division of application No. 16/146,784, filed on Sep. 28, 2018, now Pat. No. 11,531,381.

(51) Int. Cl.
    *G06F 1/16*     (2006.01)
    *G06F 1/26*     (2006.01)
    *H04W 76/10*    (2018.01)

(52) U.S. Cl.
    CPC .............. *G06F 1/1698* (2013.01); *G06F 1/26* (2013.01); *H04W 76/10* (2018.02)

(58) Field of Classification Search
    CPC ............................. G06F 1/1698; H04W 76/10
    See application file for complete search history.

(56) References Cited

U.S. PATENT DOCUMENTS

| 4,217,647 A | 8/1980 | Sjoholm et al. |
| 6,711,629 B1 | 3/2004 | Christensen et al. |

(Continued)

FOREIGN PATENT DOCUMENTS

| CN | 108139743 A | 6/2018 |
| CN | 108139744 A | 6/2018 |

(Continued)

OTHER PUBLICATIONS

Combined Search and Examination Report for Application No. GB2210535.7, dated Oct. 17, 2022.

(Continued)

*Primary Examiner* — Mohammad Ali
*Assistant Examiner* — Vincent W Chang
(74) *Attorney, Agent, or Firm* — MARSHALL, GERSTEIN & BORUN LLP

(57) ABSTRACT

A set of discrete input/output (I/O) channels for one or more field devices may be grouped, organized, and connected to a field module device, which may connect to an electronic marshalling apparatus in a marshalling cabinet via an I/O channel. The field module acts as an intermediary, decoding messages received via the I/O channel to identify commands for discrete output (DO) channels that are then forwarded appropriately. The field module may also receive variable values carried by signals on discrete input (DI) channels and encode the values to a message that may be transmitted to the marshalling apparatus and controller, thus making the variable values on the DI channels available to the controller. The field module may store a profile including information that facilitates various smart commissioning techniques, including autosensing of tags, automatic tag binding, and automatic configuration of a control element corresponding to the field module.

26 Claims, 12 Drawing Sheets

(56) References Cited

U.S. PATENT DOCUMENTS

| | | | |
|---|---|---|---|
| 7,627,455 | B2 | 12/2009 | Lenz et al. |
| 8,606,378 | B2 | 12/2013 | Zornio et al. |
| 8,762,618 | B2 | 6/2014 | Burr et al. |
| 9,083,548 | B2 | 7/2015 | Holmes et al. |
| 9,411,769 | B2 | 8/2016 | Erni et al. |
| 9,495,313 | B2 | 11/2016 | Burr et al. |
| 2002/0126620 | A1 | 9/2002 | Heckel et al. |
| 2003/0023795 | A1 | 1/2003 | Packwood et al. |
| 2005/0092825 | A1 | 5/2005 | Cox et al. |
| 2008/0126665 | A1 | 5/2008 | Burr et al. |
| 2008/0162738 | A1 | 7/2008 | Apel et al. |
| 2008/0189441 | A1* | 8/2008 | Jundt .......... G05B 19/042 714/48 |
| 2010/0149997 | A1 | 6/2010 | Law et al. |
| 2011/0131455 | A1* | 6/2011 | Law .......... H04L 12/40013 714/E11.159 |
| 2011/0245932 | A1 | 10/2011 | Schleiss |
| 2012/0078391 | A1 | 3/2012 | Zornio |
| 2012/0249349 | A1 | 10/2012 | Sasaki et al. |
| 2015/0023178 | A1 | 1/2015 | Gruber |
| 2015/0127876 | A1 | 5/2015 | Erni et al. |
| 2016/0048123 | A1 | 2/2016 | Froehner et al. |
| 2016/0076664 | A1 | 3/2016 | Erni |
| 2018/0210429 | A1 | 7/2018 | Jundt et al. |
| 2018/0231959 | A1 | 8/2018 | Jundt et al. |
| 2019/0286600 | A1 | 9/2019 | Sherriff et al. |

FOREIGN PATENT DOCUMENTS

| | | |
|---|---|---|
| EP | 3012697 A1 | 4/2016 |
| EP | 3116166 A1 | 1/2017 |
| EP | 3 410 646 A1 | 12/2018 |
| EP | 3684561 A1 | 7/2020 |
| GB | 2446258 A | 8/2008 |
| GB | 2479438 A | 10/2011 |
| GB | 2556438 A | 5/2018 |
| GB | 2568577 A | 5/2019 |
| JP | 2008-77660 A | 4/2008 |
| JP | 2012-74029 A | 4/2012 |
| JP | 2015-14883 A | 1/2015 |
| JP | 2016-518736 A | 6/2016 |
| JP | 2017-167596 A | 9/2017 |
| WO | WO-2017/066304 A1 | 4/2017 |
| WO | WO-2017066308 A1 | 4/2017 |
| WO | WO-2017/158953 A1 | 9/2017 |
| WO | WO-2017/209931 A2 | 12/2017 |
| WO | WO-2018/068040 A1 | 4/2018 |
| WO | WO-2019/055125 A1 | 3/2019 |

OTHER PUBLICATIONS

Combined Search and Examination Report for Application No. GB2210536.5, dated Oct. 24, 2022.
Combined Search and Examination Report for United Kingdom Patent Application No. GB2210533.2, dated Oct. 3, 2022.
DeltaV Distributed Control System, DeltaV™ CHARMs Commissioning, Retrieved from the Internet at: <http://www.emerson.com/documents/automation/deltav-charm-commissioning-en-56728.pdf> May 17, 2018.
DeltaV Distributed Control System, DeltaV™ IS Electronic Marshalling, Retrieved from the Internet at: <http://www.emerson.com/documents/automation/deltav-electronic-marshalling-en-57016.pdf> Jun. 6, 2018.
DeltaV™ DeltaV Distributed Control System, DeltaV Electronic Marshalling, Retrieved from the Internet at: <http://www.emerson.com/documents/automation/deltav-electronic-marshalling-en-56832.pdf> May 17, 2018.
DeltaV™, DeltaV Distributed Control System, Smart Commissioning, Retrieved from the Internet at:<http://www2.emersonprocess.com/siteadmincenter/PM%20DeltaV%20Documents/Whitepapers/dv_wp_SmartCommissioning.pdf> Jun. 6, 2018.
DeltaV™, Function Block Reference, Retrieved from the Internet at: <https://docuri.com/queue/deltav-function_59a8d6f5f581719e12adcf16_pdf?queue_id=59c9f76ef58171c60328bb9d> Jun. 6, 2018.
DeltaV™, White Paper, "Simplify Commissioning to Shorted Project Timelines", Retrieved from the Internet at: <http://docplayer.net/22962420-White-paper-simplify-commissioning-to-shorten-project-timelines.html> Jun. 6, 2018.
Examination Report for Application No. GB 1913735.5, dated Sep. 1, 2022.
Examination Report for Application No. GB 2210534.0, dated Oct. 10, 2022.
Examination Report for Application No. GB1913735.5, dated Mar. 17, 2022.
PutmanMedia®, I/O at Your Fingertips, Retrieved from the Internet at: <http://www2.emersonprocess.com/siteadmincenter/PM%20Articles/IO-at-Your-Fingertips.pdf> Jun. 6, 2018.
Search Report for Application No. GB1913735.5, dated Mar. 6, 2020.
Office Action for United Kingdom Patent Application No. GB2210532.4, dated Oct. 28, 2022.
Examination Report for Application No. GB1913735.5, dated Dec. 23, 2022.
Examination Report for Application No. GB2210532.4, dated Jan. 27, 2023.
Examination Report for Application No. GB2210533.2, dated Jan. 27, 2023.
Examination Report for Application No. GB2210534.0, dated Jan. 30, 2023.
Examination Report for Application No. GB2210535.7 dated Jan. 27, 2023.
Examination Report for Application No. GB2210536.5, dated Jan. 30, 2023.
Chinese Patent Application No. 201910929472.8, office action, dated Oct. 26, 2023.
Li , Theory of Fieldbus Technology and its Development Trend, Smart factory, 3: 61-66 (2017).
Office Action for Japanese Application No. 2023-171437, dated Aug. 6, 2024.
Office Action for Japanese Application No. 2023-171438, dated Aug. 6, 2024.
Office Action for Japanese Application No. 2023-171447, dated Aug. 6, 2024.
Office Action for Japanese Application No. 2023-171451, dated Aug. 6, 2024.
Notice of Reasons for Rejection for Japanese Application No. 2019-177724, dated Jul. 4, 2023.

* cited by examiner

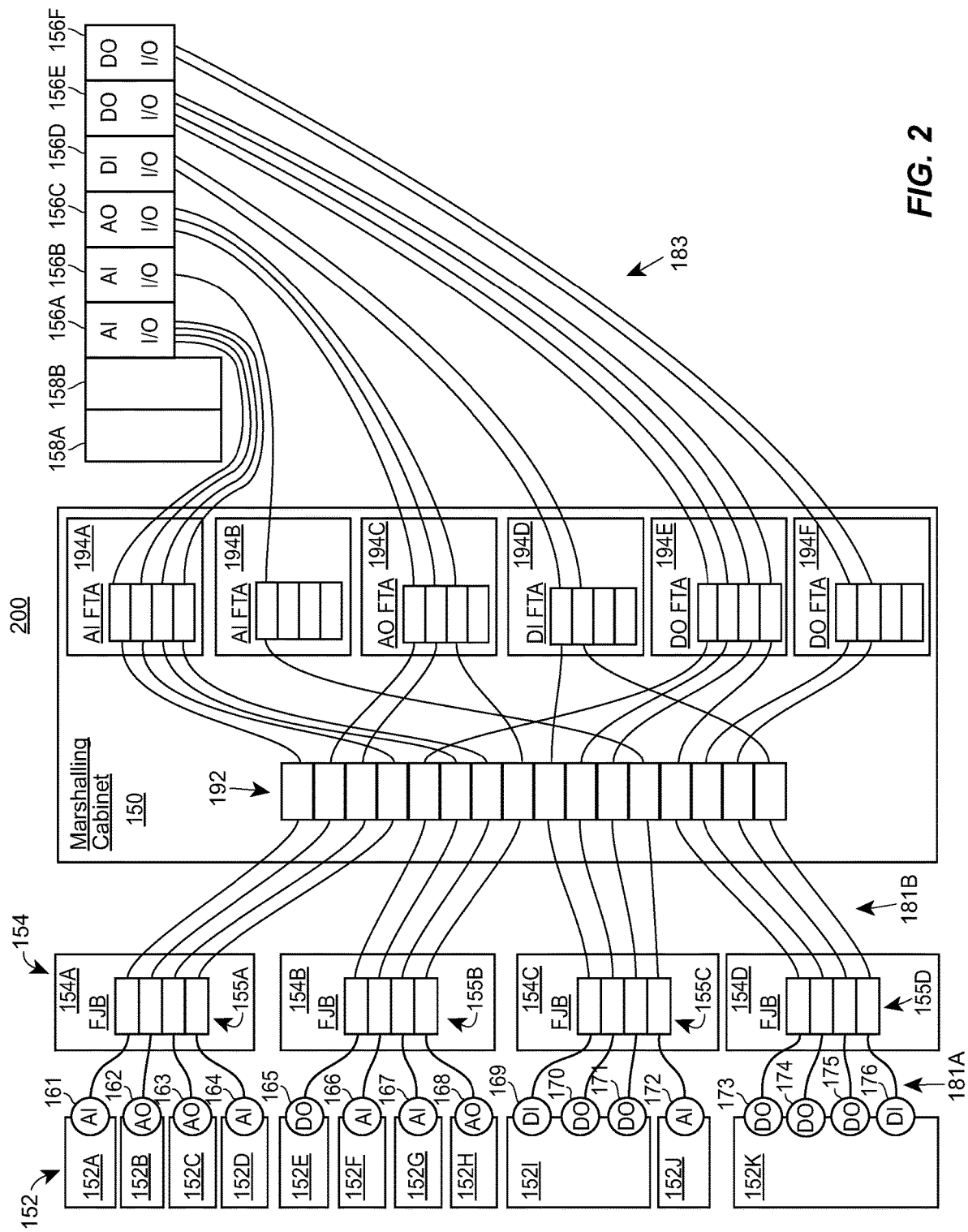

SMART FUNCTIONALITY FOR DISCRETE FIELD DEVICES AND SIGNALS

CROSS-REFERENCE TO RELATED APPLICATION

This application is a divisional of U.S. application Ser. No. 16/146,784 filed Sep. 28, 2018, entitled "Smart Functionality for Discrete Field Devices and Signals," the entire disclosure of which is hereby incorporated by reference herein.

TECHNICAL FIELD

The present disclosure relates generally to process plants and process control systems, and more particularly, to imparting smart functionality on discrete elements in a process plant.

BACKGROUND

Distributed process control systems, such as distributed or scalable process control systems like those used in power generation, chemical, petroleum, or other processes, typically include one or more process controllers communicatively coupled to each other, to at least one host or operator workstation via a process control network and to one or more field devices via analog, digital or combined analog/digital buses.

The field devices, which may be, for example, valves, valve positioners, switches and transmitters (e.g., temperature, pressure, and flow rate sensors), perform functions within the process or plant such as opening or closing valves, switching devices on and off, and measuring process parameters.

The process controllers, which are typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices.

Execution of the control modules cause the process controllers to send the control signals over the communication links or signal paths to the field devices, to thereby control the operation of at least a portion of the process plant or system, e.g., to control at least a portion of one or more industrial processes running or executing within the plant or system. For example, the controllers and the field devices control at least a portion of a process being controlled by the process plant or system.

Input/output (I/O) cards (sometimes called "I/O devices" or "I/O modules"), which are also typically located within the plant environment, typically are communicatively disposed between a controller and one or more field devices, and enable communications there between, e.g. by converting electrical signals into digital values and vice versa. Typically, an input or output for a field device is communicatively coupled to a process controller via one or more I/O cards configured for the same communication protocol or protocols as those utilized by the field device inputs and outputs. Specifically, field device inputs and outputs are typically configured for either analog or discrete communications. In order to communicate with a field device, a controller generally needs an I/O card configured for the same type of input or output utilized by the field device. That is, for a field device configured to receive analog control signals (e.g., a 4-20 mA signal), the controller needs an analog output (AO) I/O card to transmit the appropriate control signal; and for a field device configured to transmit measurements or other information via an analog signal, the controller typically needs an analog input (AI) card to receive the transmitted information. Similarly, for a field device configured to receive discrete control signals, the controller needs a discrete output (DO) I/O card to transmit the appropriate control signal; and for a field device configured to transmit information via a discrete signal, the controller needs a discrete input (DI) I/O card. Generally, each I/O card can connect to multiple field device inputs or outputs, wherein each communication link to a particular input or output is referred to as a "channel." For example, a 120 channel DO I/O card can be communicatively connected to 120 distinct discrete field device inputs, enabling the controller to transmit (via the DO I/O card) discrete control output signals to the 120 distinct discrete field device inputs.

As utilized herein, field devices, controllers, and I/O devices are generally referred to as "process control devices," and are generally located, disposed, or installed in a field environment of a process control system or plant. The network formed by one or more controllers, the field devices communicatively connected to the one or more controllers, and the intermediary nodes facilitating communication between the controllers and field devices may be referred to as an "I/O network" or "I/O subsystem."

Information from the field devices and the controllers is usually made available over a data highway or communication network (the "process control network") to one or more other hardware devices, such as operator workstations, personal computers or computing devices, handheld devices, data historians, report generators, centralized databases, or other centralized administrative computing devices that are typically placed in control rooms or other locations away from the harsher field environment of the plant, e.g., in a back-end environment of the process plant.

The information communicated over the process control network enables an operator or a maintenance person to perform desired functions with respect to the process via one or more hardware devices connected to the network. These hardware devices may run applications that enable an operator to, e.g., change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines.

Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, a process plant (or a portion of a plant) is brought online after a multi-step process including a design phase, an installation phase, and a commissioning phase. During the design phase, designers develop general control strategies and identify process elements (i.e., identify the equipment and process control devices needed to implement the control strategies). During the installation phase, process elements are installed. During the commissioning phase, the process elements are tested and generally brought to the point where the system or plant can operate as intended. Unfortunately, it is difficult to fully design some aspects of a plant before beginning installation and commissioning. These phases may be somewhat iterative in nature, and may be performed at least partially in parallel.

For example, designing the I/O network or subsystem is a complicated multi-step process. For decades, a dedicated I/O architecture has been utilized wherein each controller has one or more dedicated multi-channel I/O cards that are physically connected to a controller via a backplane. Unfortunately, designing this dedicated I/O architecture is a significant undertaking. First, process and instrumentation diagrams ("P&IDs") are designed, providing an early view of the control elements and how they are intended to be used in the control strategies. Then, an instrument list is derived from these P&IDs, which is a detailed list of each element (e.g., field device) in the design, including the device type, manufacturer, calibration ranges, etc., as well as the physical location of each element with in the process equipment. However, the field wiring design generally cannot be completed until the I/O subsystem is defined, and the I/O subsystem generally cannot be defined until the field signal usage is defined in the control strategies so that the signal and the control strategy can be assigned to an appropriate controller. Once the signal count for each controller is known, only then can the actual I/O subsystem for each controller be specified, enabling completion of the field wiring design.

Unfortunately, project changes and redesigns often disrupt and complicate field wiring installation. Typically, after the field wiring design is completed, the physical communication links can be installed to build the I/O network. Traditionally, "wired marshalling" has been the accepted industry practice for establishing the physical communication links (e.g., two or three wire links). This wired marshalling is a significant undertaking, in which field technicians wire field devices to terminal blocks in a field junction box ("FJB"), and then wire those FJB terminal blocks to a first set of terminal blocks in a marshalling cabinet in an I/O room (sometimes called a "control room"). The field technician then wires the first set of terminal blocks in the marshalling cabinet to a second set of terminal blocks in the marshalling cabinet, which is then wired to an appropriate I/O card in a "system cabinet." This I/O card is typically communicatively coupled to a controller (e.g., via a backplane) assigned to control or monitor the field devices in question.

The marshalling cabinet represents a communication interconnection point that can be a source of problems during the design and commissioning phases. Because wires typically come from the field (through multi-core cables) to the marshalling cabinet, the wiring in the cabinet generally must be cross-marshalled to ensure each connected field device is connected to its appropriate I/O card and channel. Specifically, the field devices are typically connected to a first set of terminals in the marshalling cabinet and the I/O cards are typically connected to a second set of terminals in the marshalling cabinet. To ensure proper operation, each terminal in the first set of terminals must be wired to the proper terminal in the second set of terminals (i.e., cross-marshalled) to ensure that, e.g., when the controller attempts to send a command to a field device, the intended field device receives the command.

Cross-marshalling can cause problems. Particularly, "mapping errors" may occur at multiple points. As a first example, a field device output may be wired to the wrong terminals in a marshalling cabinet and thus to the wrong I/O card channel, resulting in the information transmitted by the field device being assigned to the wrong system variable (e.g., when the field device is mistakenly wired to an I/O card of the same type as the correct I/O card), or resulting in a controller simply being unable to receive information transmitted by the field device (e.g., when the field device is mistakenly wired to an I/O card of a different type than the correct I/O card). As a second example, even if the field device is correctly wired to the marshalling cabinet, the wiring between the marshalling cabinet and the I/O card may be incorrect, resulting in the same problems. As a third example, even if the field device and the I/O card are each correctly wired to the marshalling cabinet, errors in cross-marshalling may result in the same problem. Further still, even if all of the wiring is correct, an engineer may mistakenly assign a wrong system variable to the I/O channel, resulting in errors. Identifying the source of errors and determining whether these errors stem from wiring errors or from software configuration errors can be incredibly time and labor intensive. Simply put, like the maze of cords behind billions of televisions across the world, it becomes harder and harder to keep track of where wires are coming or going-making human error far more likely.

Exacerbating issues, the field wiring activities often need to begin long before the I/O subsystem(s) design can be completed. This creates a period of uncertainty in the design, where assumptions are made based on available information that is subject to change due to project scope changes or due to control logic changes resulting in hardware changes. These late changes can be costly, especially if field devices must be redistributed to new controllers. These changes can be costly not only due to the rewiring of communication links to new I/O cards, but also due to the extra cabinet space required to accommodate the additional equipment.

Simply put, any addition of a process control device or other element in the I/O network to accommodate late design changes will add cost as these changes impact the engineering drawings, the field wiring, and sometimes the system cabinet footprint. Inevitably, every project sees its share of late changes. These changes can come from: changes in the control strategy design; late definition of skid equipment requirements; underestimation of the required control CPU capacity; adding field devices; changing device types (e.g., replacing limit switches with analog transmitters); etc.

These late project changes-a common issue-around I/O requirements can have a domino effect across the entire implementation. They can result in drawing rework, control system partitioning, moving wires, and building new cabinets. Even something as simple as replacing an installed field device can be complicated. For example, if an installed field device that is connected to a DO I/O card is replaced with a new field device configured to receive control commands via an analog signal, the field technician needs to find an AO I/O card with empty channels or install a new AO I/O card. The field technician may then need to remove the wiring between the field device and the marshalling cabinet, the wiring between the terminals in the marshalling cabinet, and the wiring between the marshalling cabinet and I/O card. Finally, the field technician needs to wire the new field device to the marshalling cabinet, wire the new I/O card to the marshalling cabinet if necessary, and ensure the cross-marshalling in the marshalling cabinet correctly couples the appropriate terminals within the marshalling cabinet.

In sum, all late changes add time, cost, and risk to a project—an issue that is only amplified by the inflexibility of traditional dedicated I/O architectures and the cross-marshalling that is necessary to ensure that field devices are communicatively coupled to the appropriate I/O card and I/O card channel.

As for commissioning, generally the commissioning of a process plant or system involves bringing various components of the plant or system to the point where the system or plant can operate as intended. After process elements have been installed, at least some of the process elements are commissioned. For example, field devices, sampling points, and/or other elements are subject to being commissioned. Commissioning is an involved and complex process which typically includes multiple actions or activities. For example, commissioning may include actions or activities such as, inter alia, verifying or confirming an identity of an installed process control device (such as a field device) and its expected connections; determining and providing tags that uniquely identify the process control device within the process control system or plant; setting or configuring initial values of parameters, limits, etc. for the device; verifying the correctness of the device's installation, operation, and behaviors under various conditions, e.g., by manipulating signals provided to the devices and performing other tests, and other commissioning activities and actions. Device verification during commissioning is important for safety reasons, as well as to conform to regulatory and quality requirements.

Other commissioning actions or activities are performed on a process control loop in which the device is included. Generally speaking, a "process control loop" includes one or more field devices and a controller configured to communicate with each other for the purpose of implementing a control scheme. For example, a control loop may include a field device that can actuate (e.g., a control valve for an inlet line to a tank) to change a manipulated variable (e.g., the flow of cold water through the pipe when the valve opens); one or more field devices measuring one or more controlled variables impacted by the change in the manipulated variable (e.g., the temperature of water in the tank); and a controller controlling the actuating field device to achieve a desired value for the manipulated variable.

In any event, commissioning actions or activities on a control loop include, for example, verifying that various signals sent across interconnections (e.g., interconnections found in marshalling cabinets) result in expected behavior at both ends of the interconnection, performing integrity checks on the process control loop, generating as-built I/O lists to indicate the actual physical connections of the devices that are implemented within the plant as well as recording other "as-installed" data, to name a few.

Typically, the commissioning of a process plant requires physical devices, connections, wiring, etc. to be installed, set up, and inter-connected in the field environment of the process plant. At the back-end environment of the plant, data that specifically identifies and/or addresses the various devices, their configurations, and their interconnections is integrated, verified or commissioned, and stored. As such, after the physical hardware has been installed and configured, identification information, logical instructions, and other instructions and/or data is downloaded or otherwise provided to the various devices disposed in the field environment so that the various devices are able to communicate with other devices.

Of course, in addition to commissioning actions performed in the back-end environment, commissioning actions or activities are also performed to verify the correctness of the connections and operations in the field environment of both the physical and logical devices, both individually and integrally. For example, a field device may be physically installed and individually verified, e.g., power-on, power-off, etc. A port of a field device may then be physically connected to a commissioning tool via which simulated signals may be sent to the field device, and the behavior of the field device in response to the various simulated signals may be tested. Similarly, a field device whose communication port is commissioned may eventually be physically connected to a terminal block at marshalling cabinet, and actual communications between the terminal block and the field device may be tested. Notably, commissioning may reveal errors in system design or field wiring. These errors can result in some of the costly late project changes previously discussed.

Typically, commissioning of field devices and/or other components in the field environment requires knowledge of component identifications, and in some cases, knowledge of component interconnections so that test signals and responses can be communicated amongst field devices and other loop components and resultant behaviors verified. In currently known commissioning techniques, such identification and interconnection knowledge or data is generally provided to components in the field environment by the back-end environment. For example, the back-end environment will download field device tags that are used in control modules into smart field devices that will be controlled by the control modules during live plant operations.

SUMMARY

Techniques, systems, apparatuses, components, devices, and methods for adding smart functionality to "dumb" discrete field devices and discrete signals are disclosed herein. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes (also referred to herein as "industrial processes") that operate to manufacture, refine, or transform, raw physical materials to generate or produce products.

The described techniques, systems, apparatuses, components, devices, and methods enable a set of discrete I/O channels for one or more field devices to be grouped, organized, and connected to a field module device (sometimes more generally referred to as a "field module," a "process control device," or a "process control entity"), which may connect to an electronic marshalling apparatus in a marshalling cabinet via a single I/O channel. The field module acts as an intermediary, decoding messages received via the single I/O channel to identify commands for DO channels that are then forwarded to the appropriate DO channels. Advantageously, a controller can reference multiple DO signals via a single I/O channel connected to the electronic marshalling apparatus. The field module may also receive variable values carried by signals on DI channels and encode the values to a message that may be transmitted to the marshalling apparatus and controller, thus making the variable values on the DI channels available to the controller.

The field module may store a profile including information relevant to commissioning and configuring the field module and any connected field devices, such as a tag unique to the field module itself and/or signal tags unique to the DI and DO channels connected to the field module. Information in the profile can be autosensed by the electronic marshalling apparatus (and, in particular, by a signal characterization component or module connected to the marshaling apparatus), enabling any of the tags in the profile to be assigned or bound to an I/O channel on which the corresponding DI or DO signal exists. These autosensing and binding techniques to autosense a tag of a field module and to automatically update a binding for the tag enable easy and fast reconfiguration and rewiring of the I/O networks.

One or more controllers may be configured to automatically configure a DIO control element or function block corresponding to the field module, which may be utilized by control routines to write to the DO signals connected to the field module and/or to read values carried by the DI signals connected to the field module. During this auto configuration procedure, the inputs of the DIO control element are bound to signal tags representing the DO signals connected to the field module, enabling other routines or blocks to write to the DO signals by writing to the DIO control element inputs. Similarly, the outputs of the DIO control element are bound to signal tags representing DI signals, enabling other routines or blocks to read values carried by the DI signals by receiving and reading the outputs of the DIO control element.

A portable device that may be utilized to update the profile of the field module is also described. Generally speaking, the portable device may establish one or more short range communication channels with the field module and use that communication channel to download new information to the profile of the field module. Example short range communication channels include RFID channels, NFC channels, Bluetooth channels, and Wi-Fi direct channels. Helpfully, the portable device enables a person in the field environment to quickly and easily update the field module while in close proximity (e.g., after updating field wiring to add, replace, or remove a channel to a field device) rather than requiring the person to return to a workstation in the back-end environment of the plant. Thus, the portable device enables the person to visually inspect the field module and confirm or reconfirm that information in the updated profile accurately reflects the changes in field wiring, field device connections, or control schemes.

Note, this summary has been provided to introduce a selection of concepts further described below in the detailed description. As explained in the detailed description, certain embodiments may include features and advantages not described in this summary, and certain embodiments may omit one or more features and/or advantages described in this summary.

BRIEF DESCRIPTION OF THE DRAWINGS

FIG. 2 is a block diagram depicting a prior art I/O network with a dedicated I/O architecture including fixed, dedicated I/O cards and direct marshalling.

DETAILED DESCRIPTION

As discussed above, a process plant, process control system, or process control environment that, when on-line, operates to control one or more industrial processes in real-time may be commissioned utilizing one or more of the novel smart commissioning techniques, systems, apparatuses, components, devices, and/or methods described herein. The process plant, when commissioned and operating on-line, includes one or more wired or wireless process control devices, components, or elements that perform physical functions in concert with a process control system to control one or more processes executing within the process plant. The process plant and/or process control system may include, for example, one or more wired communication networks and/one or more wireless communication networks. Additionally, the process plant or control system may include centralized databases, such as continuous, batch, asset management, historian, and other types of databases.

Below, the description is organized into sections describing the following: (I) an example plant environment in which an improved I/O network for discrete process elements may be found; (II) a prior art I/O network with a dedicated I/O architecture including fixed, dedicated I/O cards and direct marshalling; (III) the improved I/O network for discrete process elements; (IV) smart commissioning techniques for discrete process elements; (V) an improved discrete I/O communications protocol; and (VI) other considerations.

I. An Example Plant Environment 5

Figure 1A:
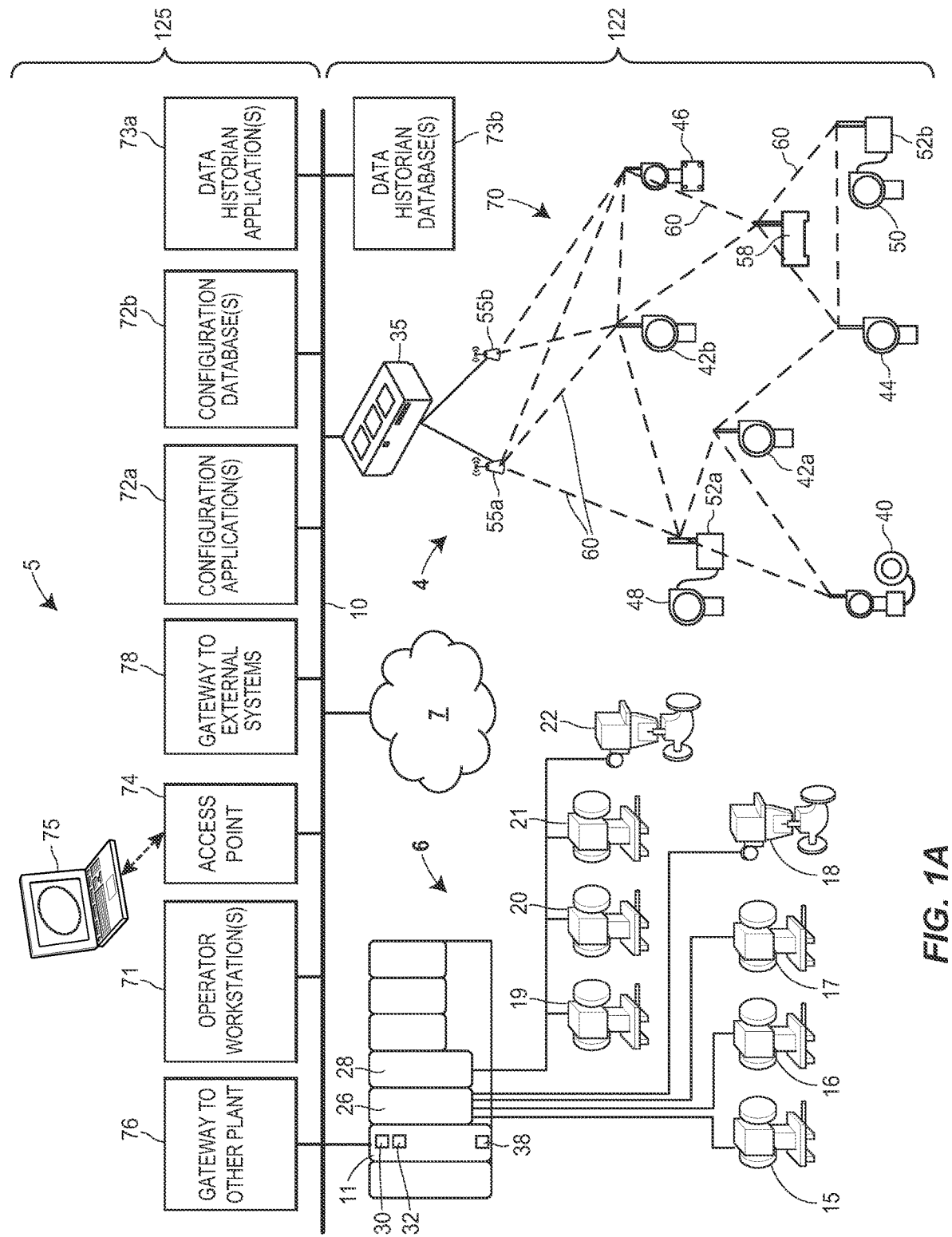
FIG. 1A is a block diagram of an example process plant including an I/O network that is configured according to one or more of the discrete I/O management techniques described herein and that includes discrete elements that may be commissioning using one or more of the smart commissioning techniques described herein.

To illustrate, FIG. 1A is a block diagram of an example process plant, process control system, or process control environment 5, including an input/output (I/O) network 7 configured according to one or more of the discrete I/O signal management techniques described herein. Note, in the process control industry, the term "I/O" is sometimes used in a number of related but different contexts. The term generally refers to a logical link or communication channel that communicatively couples a field device to an I/O card or controller (e.g., "I/O channel"), but may be used when referring to a number of other concepts, such as the devices that transmit signals to or receive signals from field devices via I/O channels (e.g., "I/O devices" or "I/O cards"), connectors or terminals associated with the I/O devices (e.g., "I/O connectors"), the signals transmitted on the I/O channel (e.g., "I/O signals), variables or commands represented by the signals (e.g., "I/O parameters"), or the values of the variables or commands carried by the signals (e.g., "I/O parameter values"). To the extent the term "I/O" is referenced herein without a qualifier, the context of the sentence should make clear which of these concepts is being discussed. Further, it should be understood that an "I/O channel" represents a particular type of "communication channel" or "channel." That is, unless the context of the sentence suggests otherwise, references in this description to the term "channel" or the term "communication channel," without the qualifier "I/O," may refer to a communication link that could be an I/O channel in some implementations, but may also refer to a communication link other than an I/O channel in some implementations.

The process plant 5 controls a process, which may be said to have one or more "process outputs" characterizing the state of the process (e.g., tank levels, flow rates, material temperatures, etc.) and one or more "process inputs" (e.g., the state of various environmental conditions and actuators, the manipulation of which may cause process outputs to change). The process plant or control system 5 of FIG. 1A includes a field environment 122 (e.g., "the process plant floor 122") and a back-end environment 125, each of which are communicatively connected by a process control backbone or data highway 10, which may include one or more wired and/or wireless communication links, and may be implemented using any desired or suitable communication protocol such as, for example, an Ethernet protocol.

At a high level (and as shown in FIG. 1A), the field environment 122 includes physical components (e.g., process control devices, networks, network elements, etc.) that are disposed, installed, and interconnected to operate to control the process during run-time. For example, the field environment includes an I/O network 6 and an I/O network 7. By and large, the components of each of these I/O networks are located, disposed, or otherwise included in the field environment 122 of the process plant 5. Generally speaking, in the field environment 122 of the process plant 5, raw materials are received and processed using the physical components disposed therein to generate one or more products.

By contrast, the back-end environment 125 of the process plant 5 includes various components such as computing devices, operator workstations, databases or databanks, etc. that are shielded and/or protected from the harsh conditions and materials of the field environment 122. In some configurations, various computing devices, databases, and other components and equipment included in the back-end environment 125 of the process plant 5 may be physically located at different physical locations, some of which may be local to the process plant 5, and some of which may be remote.

A. The Field Environment 122 of the Plant 5

As noted, the field environment 122 includes the I/O networks 6 and 7, each of which may be coupled to the plant network 10. Each I/O network 6 and 7 includes one or more controllers, field devices communicatively connected to the one or more controllers, and intermediary nodes facilitating communication between the controllers and the field devices (e.g., I/O cards).

Each process controller in the process plant 5 implements a control strategy defined by one or more control routines, which may be stored to a memory of the controller. When a processor of the controller executes one or more of the control routines, the controller transmits to a field device a control signal (i.e., a "control output") over wired or wireless process control communication links or networks to other field devices to control the operation of a process in the plant 5. The controller may generate a control signal based on: (i) one or more received signals, which may be referred to as "control inputs" (e.g., one or more received signals representing measurements obtained by field devices), and (ii) the logic of the one or more control routines, which may be defined by one or more software elements (e.g., function blocks). Typically, a controller manipulates a process input (which may be referred to as a "manipulated variable") to change a particular process output (which may be referred to as a "controlled variable" or simply a "process variable") based on feedback (i.e., a measurement of the controlled variable) and a desired value for the process output (i.e., a setpoint).

Generally, at least one field device performs a physical function (e.g., opening or closing a valve, increasing or decreasing a temperature, taking a measurement, sensing a condition, etc.) to control the operation of a process implemented in the process plant 5. Some types of field devices communicate with controllers by using I/O devices (e.g., "I/O cards"). Process controllers, field devices, and I/O cards may be wired or wireless, and any number and combination of wired and wireless process controllers, field devices, and I/O devices may be included in the process plant environment or system 5.

For example, FIG. 1A illustrates a process controller 11 that is communicatively connected to wired field devices 15-22 via input/output (I/O) cards 26 and 28, and that is communicatively connected to wireless field devices 40-46 via a wireless gateway 35 and the data highway 10. In some configurations (not shown), the controller 11 may be communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the Delta V™ controller sold by Emerson Process Management, may operate to implement a batch process or a continuous process using at least some of the field devices 15-22 and 40-46. In an embodiment, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1A, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1A includes a processor 30 that implements or oversees one or more process control routines 38 (e.g., that are stored in a memory 32). The processor 30 is configured to communicate with the field devices 15-22 and 40-46 and with other nodes communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

The controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of: (i) an input function, such as that associated with a transmitter, a sensor or other process parameter measurement device (sometimes referred to as "input blocks"); (ii) a control function, such as that associated with a control routine that performs PID, fuzzy logic, etc. (sometimes referred to as "control blocks"); or (iii) an output function which controls the operation of some device, such as a valve, to perform some physical function within the process control system 5 (sometimes referred to as "output blocks"). Of course, hybrid and other types of function blocks exist.

Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. One or more of the control routines 38 may implement one or more control loops which are performed by executing one or more of the function blocks.

The wired field devices 15-22 may be any types of devices, such as sensors, valves, transmitters, positioners, etc., while the I/O cards 26 and 28 may be any types of process control I/O devices conforming to any desired communication or controller protocol. In FIG. 1A, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the I/O cards 26, 28 additionally or alternatively communicate with the controller 11 using the process control data highway 10 and/or by using other suitable control system protocols (e.g., Profibus, DeviceNet, Foundation Fieldbus, ControlNet, Modbus, HART, etc.).

In FIG. 1A, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1A, a field device 48 of FIG. 1A is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1A, the wireless devices 40-46 and 52-58 communicate with each other and with the wireless gateway 35 over wireless links 60 of the wireless communications network 70, and/or via the process control data highway 10.

B. The Back-End Environment 125 of the Plant 5

As noted, the back-end environment 125 includes various components such as computing devices, operator workstations, databases or databanks, etc. that are typically shielded and/or protected from the harsh conditions and materials of the field environment 122. The back-end environment 125 may include any one or more of the following, each of which may be communicatively connected to the data highway 10: (i) one or more operator workstations 71; (ii) a configuration application 72a and a configuration database 72b; (iii) a data historian application 73a and a data historian database 73b; (iv) one or more other wireless access points 74 that communicate with other devices using other wireless protocols; and (v) one or more gateways 76, 78 to systems external to the immediate process control system 5.

1. The Operator Workstations 71

The operator workstations 71 may be utilized by operators to view and monitor run-time operations of the process plant 5, as well as take any diagnostic, corrective, maintenance, and/or other actions that may be required. At least some of the operator workstations 71 may be located at various, protected areas in or near the plant 5, and in some situations, at least some of the operator workstations 71 may be remotely located, but nonetheless in communicative connection with the plant 5. Operator workstations 71 may be wired or wireless computing devices.

2. The Data Historian 73a and Database 73b

The data historian application 73a operates to collect some or all of the data provided across the data highway 10, and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices.

3. The Wireless Access Points 74

The one or more other wireless access points 74 enable devices in the back-end environment 125 (and sometimes in the field environment 122) to communicate with other devices using wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radio communication Sector) compatible protocols, short-wavelength radio communications such as near field communications (NFC) and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, or wireless devices 35, 40-58) also communicate using the wireless protocol supported by the access points 74.

4. The Gateways 76 and 78

The gateways 76 and 78 may interface with systems that are external to the immediate process control system 5. Typically, such systems are customers or suppliers of information generated or operated on by the process control system 5. For example, the process control plant 5 may include a gateway node 76 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1A only illustrates a single controller 11 with a finite number of field devices 15-22 and 40-46, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

5. The Configuration Applications 72a and Database 72b

Remaining with FIG. 1A, the configuration application 72a and the configuration database 72b may be utilized to configure certain aspects of the plant 5. Various instances of the configuration application 72a may execute on one or more computing devices (not shown) to enable users to create or change process control modules and download these modules via the data highway 10 to the controllers 11, as well as to enable users to create or change operator interfaces via which in operator is able to view data and change data settings within process control routines. The configuration database 72b stores the created (e.g., configured) modules and/or operator interfaces. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, the configuration database 72b, and the user interfaces thereto (not shown) comprise a configuration or development system 72 for control and/or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5 (also referred to interchangeably here as "run-time" operations of the process plant 5).

Regarding commissioning, the configuration database 72b may store data and other information that specifically identifies and/or addresses the various devices or components and their interconnections that are planned for or desired to be implemented on the process plant floor or field environment 122. Some of this commissioning data may be provided to components in the field environment 122 for use in commissioning of devices and loops therein, and some of this data may be utilized in the back-end environment 125, e.g., for the design, development, and preparation of control modules and or operator interface modules that will operate in conjunction with the field environment 122 during live operations of the process plant 5. In an example, an approved control module is downloaded into a process controller so that, when executed during live operations, the process controller operates in accordance with its resident control module to send and receive various signals to/from other components in its loop (and, in some cases, to/from other process controllers), thereby controlling at least a portion of the process in the process plant 5.

The configuration database 72b may store a number of logical identifiers of components in the field environment 122, enabling the controller 11 and other devices to reference the components and signals associated with the components by way of the logical identifiers. For example, for a given field device, the configuration database 72b may store information mapping or binding a logical identifier to a particular hardware address or I/O channel. The hardware address may identify a particular controller, a particular I/O card connected to the particular controller, and/or a particular address for the I/O channel connecting the particular I/O card to the field device. In some instances, this mapping or binding may be stored at the controller 11, the user interface device 75, the operator workstation 71, or any other desired device (e.g., any device needing to resolve the logical identifier). After a logical identifier has been bound to a hardware address or I/O channel, the identifier is considered "assigned." In some cases, the system 5 includes "unassigned" logical identifiers, which are identifiers that a software element (e.g., a control routine and/or a function block) references but that has no binding. That is, a logical identifier is considered "unassigned" when the system 5 and the configuration database 72b have no hardware address or I/O channel that has been bound to the tag. Thus, when an unassigned logical identifier is referenced by a control routine, no value carried by a signal in the plant 5 will be read and no command will be transmitted via a signal to a field device in the plant 5.

Examples of such logical identifiers include Device Tags (DTs), each of which represents a particular instrument, controller, valve, or other physical field device, and Device Signal Tags (DSTs), each of which represents a particular signal that is received or generated by a particular device and that typically corresponds to a particular parameter utilized by the field device. For some devices, a Device Signal Tag comprises a combination of a device's Device Tag and an identifier of a specific signal received or generated by that device, e.g., an identifier of a specific parameter referenced by a control module. For some devices, typically legacy or dumb devices, a Device Tag represents both the physical device and a signal generated by the device. Generally speaking, a device's logical identifier is used by the process plant 5 in both the field environment 122 and in the back-end environment 125 to uniquely identify the device. The DTs and DSTs may be referred to as "system tags" or "system identifiers."

In some instances, the smart field devices 19-22 also may store logical identifiers unique to the smart field devices 22. These logical identifier may be distinct from the system tags utilized by the plant 5 to identify the field devices 19-22, and may be referred to as "source identifiers" or "source tags." Source tags may or may not be stored at the configuration database 72b, depending on the implementation.

C. An Example Control Routine 101

Figure 1B:
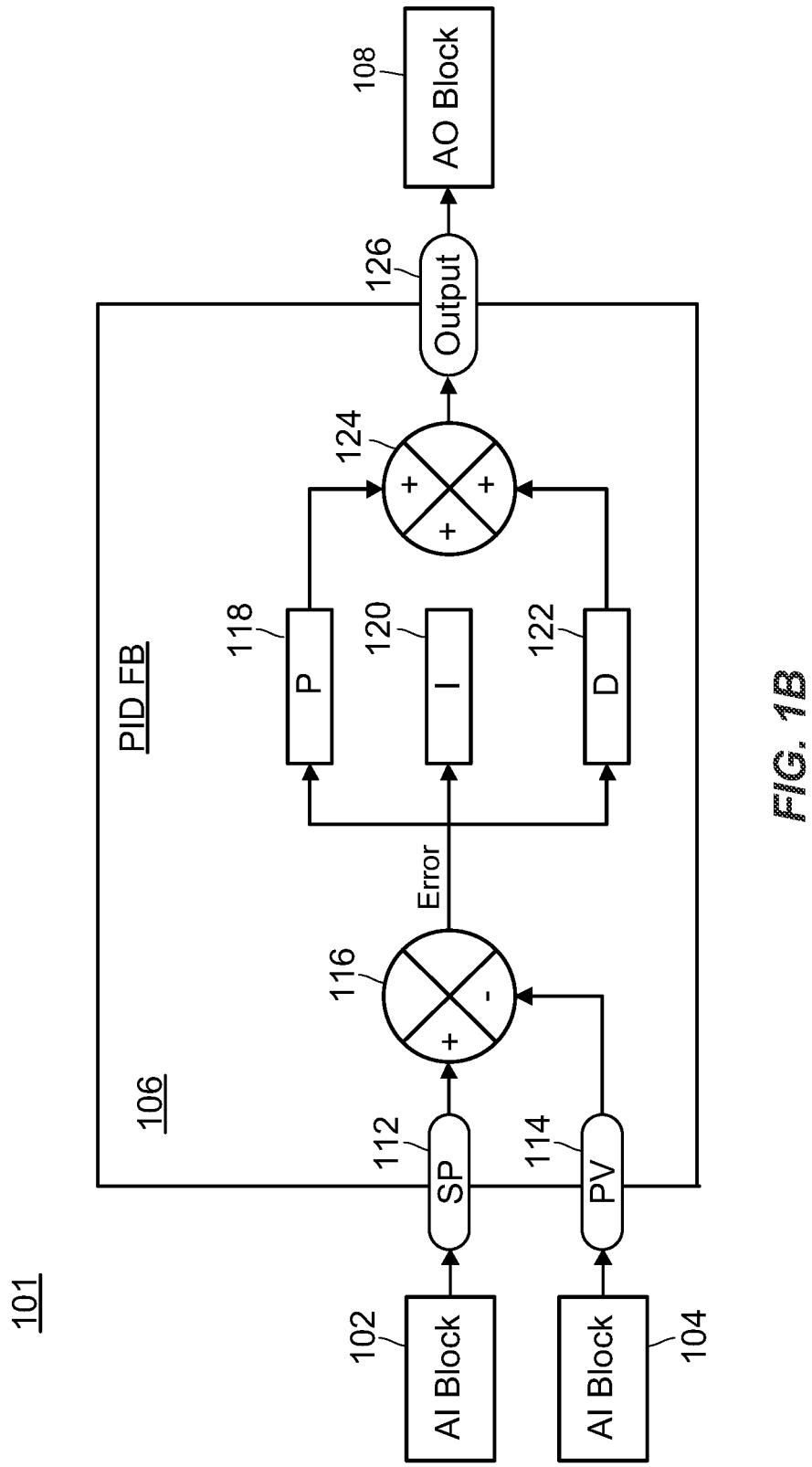
FIG. 1B depicts an example of one of the control routines that may be implemented by the controller shown in FIG. 1A.

FIG. 1B depicts a control routine 101, which is an example of one of the control routines 38 that may be implemented by the controller 11 shown in FIG. 1A. The control routine 101 includes four blocks: an analog input (AI) block 102, an AI block 104, a control block 106, and an AO block 108.

The routine 101 is designed and generated utilizing any suitable configuration and design system, such as the configuration application 72a (shown in FIG. 1A) executing on any suitable computing device (e.g., a stationary workstation or desktop, a laptop, tablet, etc.). A designer creates the routine 101 by dragging and dropping each of the blocks from a library onto a canvas area (not shown) displayed by the application 72a. The designer may then instantiate and configure each block, as well as create links between the blocks to define the control routine 101.

While the control routine 101 provides an analog output based on a set of analog inputs, it will be appreciated that control routines implemented by the controller 11 or other controllers in the plant 5 may provide any suitable number of analog or digital outputs based on any suitable number of analog or digital inputs. Inputs to control function blocks and control routines utilized in the plant 5 may be parameter values received from field devices (e.g., via analog input blocks or discrete input blocks) or parameter values received from other control function blocks or other control routines. Likewise, outputs provided by control function blocks and control routines implemented by controllers in the plant 5 may be parameter values or commands that are provided as inputs to other control routines or blocks (e.g., discrete or analog output blocks providing the parameters or commands to field devices, control function blocks such as PID blocks or discrete control blocks, etc). While the control routine 101 includes the PID function block 106, it will be appreciated that control routines implemented at the plant 5 may utilize other types of control function blocks. For example, FIB. 4B shows an example discrete control ("DC") function block that may be utilized in a control routine implemented by a controller.

In any event, a designer may design the routine 101 and other control routines implemented by the controllers described herein using the configuration application 72a shown in FIG. 1A. Specifically, a designer may design a routine by adding to a "canvas area" visual representations of blocks he or she wants included in the routine, interacting with the visual representations to configure parameters and logic associated with the blocks (e.g., by clicking on a visual representation to activate a drop-down menu that enables such configuration), and establishing connections between inputs and outputs of blocks to thereby define the flow of information between the blocks and consequently facilitate the design of the logic of the broader control routine. For example, with reference to the control routine 101 specifically, the designer may drag a generic PID block template (not shown) onto the canvas area to instantiate the PID function block 106 shown in FIG. 1B. At a high level, a PID block includes logic for driving a process variable (PV) or controlled variable (CV), such as a temperature level for fluid in a tank, to a desired level or setpoint (SP) by manipulating a manipulated variable (MV), such as a valve position for a control valve on an inlet hot water line. The generic PID block template is configured to: (i) calculate an error 114 between a setpoint 112 and a measured process variable 114; and (ii) apply a proportional term 118, an integral term 120, and/or a derivative term 122 to the error 116 to produce an output value 126. Generally speaking, the output value 126 represents an additional change to the MV needed to move the PV 114 closer to the setpoint. As an example, a PID block may gradually open a valve over time to avoid overshooting the SP 112, and may consequently rely on feedback of the measured PV 114 to incrementally command a valve open more and more (or less and less as the PV 114 nears the SP 112). When the error 114 is zero, the output 126 will be zero, indicating no further change is necessary to achieve the desired SP 112.

When the designer instantiates the function block 106, she may configure the parameters 118-122 to affect the behavior of the function block 106. For example, the designer may change one or more of the terms 118-122 to cause the block 106 to more aggressively reach the SP 112 at a higher risk of both overshooting the SP 112 and developing oscillation, or may change one or more of the terms to cause the controlled variable to reach the SP 112 at slower and more conservative rate that is less likely to lead to overshoot and/or oscillation.

The input blocks 102 and 104 may be instantiated by dragging and dropping template AI blocks onto the canvas area and binding each of them to a tag. For example, a designer may bind the AI block 104 to a system tag (e.g., TI-093) unique to a field device measuring the PV (e.g., a temperature) that the designer wants to use as the measured PV 114 for the PID block 106. The user may then draw a link between the AI block 104 and the PV 114 of the function block 106 to cause the AI block 104 to feed the PV 114. A system tag may similarly be bound to the AI block 102. In some cases, a designer may use a tag representing variable that can be changed by the user (e.g., to adjust the setpoint). In some cases, rather than using the AI block 102 as input for the SP 112, the designer may utilize the output of a second function block, thereby implementing cascade control.

Finally, the output block 108 may be instantiated by dragging and dropping a template AO block onto the canvas area and binding it to a tag (e.g., a tag unique to the previously described control valve). The designer may then link the output 126 to the block 108 so that the PID block 106 feeds to AO block 108.

The control system 5 may include a number of other block templates that are configured to use a particular routine or logic configured to derive an output, as well as other control routines that are developed by linking one or more input blocks, control blocks, and/or output blocks created from templates.

II. An Example Prior Art I/O Network 200 and Direct Marshalling

FIG. 2 is a block diagram depicting a prior art I/O network 200 with a dedicated I/O architecture including fixed, dedicated I/O cards and direct marshalling. At a high level, direct marshalling involves wiring each field device I/O to a particular terminal block in a marshalling cabinet; wiring each I/O card channel to a terminal block in a field terminal array (FTA), in the marshalling cabinet, dedicated to that I/O card; and coupling the field device I/Os to the I/O cards by cross-marshalling the terminal blocks and the FTAs in the marshalling cabinet.

The I/O network 200 includes a process controller 158A, a redundant backup controller 158B (collectively "the controller 158") and I/O cards 156A-F, which are communicatively connected to a set of field devices 152A-K via a marshalling cabinet 150, a set of field junction boxes (FJBs) 154A-D, and a number of wired links 181A, 181B, and 183.

The I/O network 200 enables the process controller 158 to control a process, or a part of a process, via one or more of the field devices 152. Unfortunately, the design of the I/O network 200 is inflexible and difficult to change after field wiring has been completed, making project changes expensive in terms of labor, time, and material.

During the design phase of the I/O network 200, P&IDs are designed, providing an early view of the control elements (e.g., field devices 152) and how they are intended to be used in the control strategies involving the network 200. Then, an instrument list is derived from these P&IDs, which is a detailed list of each element (e.g., field device) in the design, including the device type, manufacturer, calibration ranges, etc., as well as the physical location of each element with in the process equipment. As part of the design phase, designers define the field signals associated with each field device 152 and assign each assigned signal to a controller.

As shown in FIG. 2, each of the field devices 152 has one or more I/O terminals 161-176 for sending or receiving signals, and each of the terminals 161-176 has a specified signal type (e.g., AO, AI, DI, or DO). For the sake of clarity, the terminals are labeled as "input" or "output" from the perspective of the control system. For example, the field devices including the terminals 161, 164, 166, 167, and 172 are each configured to transmit an analog input or "AI" signal (e.g., carrying a process measurement) via the terminals. The field devices including the terminals 162, 163, and 168 are each configured to receive an analog input or "AO" signal (e.g., carrying a control command, such as a command to open a valve) via the terminals. The field devices including the terminals 169 and 176 are each configured to transmit a digital input or "DI" signal via those terminals. The field devices including the terminals 165, 170, 171, 173, 174, and 175 are each configured to transmit discrete output or "DO" signals via those terminals.

As shown in FIG. 2, each of the signals associated with the terminals 161-176 is assigned to the controller 158. A signal count of each type of signal specified for the terminals 161-176 enables designers to determine the number and type of each I/O card 156 necessary to enable the controller 158 to communicate with each of the field device 152 inputs and outputs.

Selecting I/O cards is important because each I/O card 156 (*i*) has a limited number of I/O channels, and (ii) is configured for a particular type of signal and can only be utilized for that type of signal. Note, the term "I/O channel" refers to the logical link connecting an I/O card or controller to a field device. Each I/O channel may include multiple physical links and points of termination connecting those physical links. The I/O cards 156 are limited to four I/O channels, but it will be noted that some dedicated I/O cards have a different limit on I/O channels (e.g., eight channels). As noted, each I/O card 156 is configured for a particular type of signal and can be utilized only for that type of signal. As an example, the AI I/O card 156A can only send AI signals; it cannot send DI signals or receive DO or AO signals. This requirement, along with the requirement that each of the I/O cards 156 only supports up to four channels, results in unused and wasted terminal blocks. For example, five of the field device terminals 161-176 are configured to transmit an AI signal.

After the design phase is completed, technicians can begin the field wiring phase of development. The I/O terminals 161-176 are wired to the corresponding field junction boxes FJBs 154A-154D, which are then wired to a set of terminals 192 in a marshalling cabinet 150. Note, each of the terminals 161-176 is connected to a corresponding terminal in a FJB and a corresponding terminal 192 in the marshalling cabinet 150. That is, for every I/O terminal 161-176 that exists, a corresponding terminal 192 must be utilized. The set of terminals 192 are wired to field terminal assemblies (FTAs) 194A-194F, each of which is wired to a corresponding I/O card 156A-F.

The process of wiring the terminals 192 to the FTAs 194 is referred to as "cross-marshalling." Cross-marshalling typically is necessary because the organization of wires connecting to the terminals 192 is determined by the physical layout of the plant, while the organization of the FTAs 194 is determined by signal type for the I/O card 156 connected to the FTA. Specifically, field devices sharing close proximity often share a FJB and are wired to the first available terminals 192, resulting in groupings of terminals 192 that roughly correspond to FJBs but that have no other discernible method of organization. By contrast, the FTAs 194 are organized by signal type because each feeds a particular I/O card 156. For example, the FTA 194A corresponds to the AI card 156A. Thus, each of the terminals 194A needs to be connected a terminal 192 that is connected to an AI channel (i.e., wired to an AI field device terminal). Similarly, the FTA 194C corresponds to the AO card 156C, so each of the terminals in the FTA 194C should be wired to terminals 192 that are wired to AO channels (i.e., connected to AO field device terminals). The terminals of the FTA 194D similarly should serve as an interconnection between the DI card 156D and terminals 192 that are wired to DI field device terminals.

Of note, channel limitations associated with the dedicated I/O cards 156 results in inefficient deployment of I/O cards and unused I/O channels, terminal blocks, and associated cabinet space in the marshalling cabinet 150. Because each of the I/O cards 156 only supports four channels, two AI cards 156A and 156B must be installed and connected to the controller 158, and two corresponding FTAs 194A and 194B must be utilized. For example, the FTA 194B includes three unused terminals and the I/O card 156B has three unused I/O channels due to the signal count requirements and the limitations of the dedicated I/O cards 156. This imperfect match between signal requirements for the field devices 152 and the limitations of the I/O cards 156 results in an inefficient deployment of the I/O cards 156. Despite the fact that the controller 158 is assigned 16 signals, the controller 158 requires six dedicated I/O cards. If the signal count were perfectly distributed by type, the controller 158 would only require four I/O cards.

Of further note, the I/O network 200 requires an I/O channel for every DI and DO terminal 161-176, even when a single field device can transmit or receive multiple inputs and/or outputs. For example, the field device 152I has two DI terminals and one DO I/O terminal, and the field device 152K has one DI terminal and three DO terminals. Consequently, when the controller 158 needs multiple parameters obtained by or associated with the field device 152I (e.g., to implement the associated control strategy), an I/O channel must be wired for each parameter represented by a DI signal, resulting in multiple wired I/O channels and additional field wiring complexity. This is problematic because in most plants a significant portion of field device inputs and outputs are configured for discrete signaling.

Generally speaking, this problem with a high ratio of I/O channels to field device variables is less of an issue with smart field devices configured to send or receive analog signals because of the HART® protocol. The HART® protocol enables a field device or controller to use the loop current magnitude on an I/O channel to send or receive an analog signal (carrying a "primary variable" value) and to superimpose a digital carrier signal on the current loop signal (carrying one or more "secondary variable" values) to enable two-way field communication between the smart field device and the controller. Thus, a smart field device and/or controller may utilize the superimposed digital carrier signal to transmit and receive secondary variable values in addition to the primary variable value associated with an AI or AO signal. As an example, a smart field device configured for analog signaling may utilize the superimposed carrier signal to transmit the field device's tag, a DST associated with each primary variable and secondary variable, status information about the field device, device alarms, etc. The ability of smart field devices to transmit tags as a secondary variable can be especially helpful when commissioning the field device and configuring the I/O network.

By contrast, the DI and DO cards 156D-F and the field devices 152I and 152K have no similar capability to send or receive secondary variable values. Like most devices configured for discrete signaling, these are "dumb devices," capable of nothing more than sending or receiving the single variable value represented by the signal level on the DI or DO channel.

Generally, as used herein, "smart" or "intelligent" field devices are field devices that integrally include one or more processors and one or more memories. As noted, smart field devices are typically analog devices configured to receive or transmit a primary variable value via an AI or AO channel. On the other hand, "dumb" or "legacy" field devices generally do not include on-board processor(s) and/or on-board memories and generally have no ability to transmit secondary variable values.

III. The I/O Network 7 of the Plant 5 and Electronic Marshalling

Figure 3:
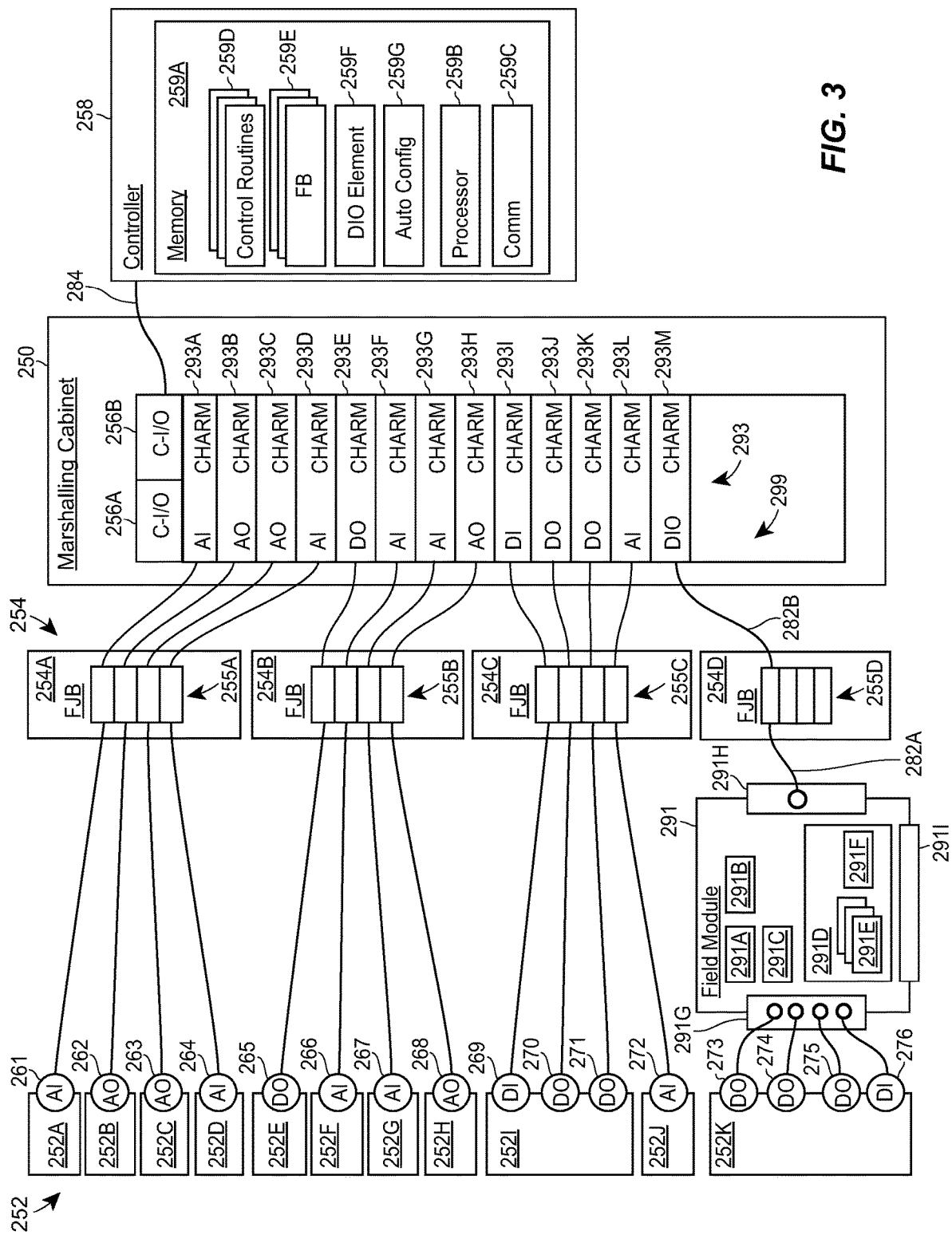
FIG. 3 is a block diagram depicting one of the I/O networks shown in FIG. 1A, which can be easily designed, wired, redesigned, and commissioned utilizing the techniques described herein.

FIG. 3 is a block diagram depicting the I/O network 7 (also shown in FIG. 1A), which imparts smart functionality on discrete elements and can be easily designed, wired, redesigned, and commissioned utilizing the techniques described herein. The I/O network 7 includes a set of signal CHARacterization Modules (i.e., "CHARMs") 293 that simplify field wiring, consolidate and organize signals, reduce cabinet footprint, and minimize inefficient I/O card deployment. Generally speaking, at a high level, a CHARM is a component configured to either: (i) identify and characterize an analog or discrete input signal from a field device to identify information carried by the signal and to forward the identified information to an I/O card or controller in an acceptable format (e.g., via a digital communication bus), or (ii) identify and characterize signals from the I/O card or controller (e.g., by identifying voltage or current levels on a digital communication bus) to identify information carried by the signals and to forward the identified information to the appropriate field device (e.g., via an analog or discrete output signal transmitted to the field device). In some instances, the CHARMs described in this disclosure are interchangeably referred to as "electronic marshalling components" or "signal characterization components."

Further, the network 7 includes a discrete input and output (DIO) subnetwork 299 that includes a CHARM 293M, a field module 291 coupled to the CHARM 293M via a bi-directional communication channel 282, and one or more field devices coupled to the field module 291 via I/O subchannels carrying DI or DO signals. The DIO subnetwork 299 enables the plant 5 to "tag" dumb field devices that rely on discrete I/O signals for communication, and to implement "smart" functionality that is typically not available with respect to dumb field devices. Unlike typical DI or DO CHARMs, the CHARM 293M is capable of bidirectional communication and is capable of being coupled to multiple discrete input or discrete output channels to one or more field devices.

The I/O network 7 includes field devices 252A-K; FJBs 254-D including terminals 255A-D; the field module 291; a marshalling cabinet 250 including a CHARM I/O or C-I/O card 256A and a backup CHARM I/O card 256B; the set of CHARMs 293; and process controllers 258A-B.

The field devices 252A-K are similar to the field devices 152A-K shown in FIG. 2 and the field devices 15-22 shown in FIG. 1A. During the design phase of developing the I/O network 7, designers develop an instrument list and define the field signals associated with each of the field devices 252A-K. Like the field devices 152A-K, each of the field devices 252A-K has one or more I/O terminals or connectors 261-276 for sending or receiving signals, and each of the connectors 261-276 has a specified signal type (e.g., AO, AI, DI, or DO). Near the end of the design phase, designers develop a signal count of each type of signal specified for the terminals 261-276. The signal count enables designers to determine the number and type of each CHARM 293 necessary to enable the controller 258 to communicate with each of the field device 252 inputs and outputs.

After the design phase is completed, technicians can begin the field wiring phase of development. The I/O terminals 261-272 are wired to the corresponding FJBs 254A-254C, which are then communicatively connected to the CHARMs 293A-L.

A. The CHARMs 293 and the C-I/O Card 256 of the I/O Network 7

Each of the CHARMs 293 is a pluggable/removable electronic component that can be inserted into a marshalling apparatus via a socket connected to a terminal block at the marshalling cabinet 250. Each CHARM 293 may include (i) a first communication interface that communicatively connects to a first link (e.g., a backplane bus supporting digital communications) to the I/O card 256, thereby establishing communication with the I/O card 256 and (ii) a second communication interface that communicatively connects to a second link to a field device (e.g., via the terminal block and a two, three, or four wire connection between the terminal block and the field device terminals). One or more of the CHARMs 293 may be powered via the backplane and/or first communication interface.

CHARMs are configured to receive a particular type of signal via the first communication interface and to transmit the information carried by the signal via the second interface, or vice versa. CHARMs configured to communicate with field devices via an analog signal may include an analog-to-digital (A/D) converter, enabling signal conversion between the digital signals on the first link and analog signals on the second link. For example, a CHARM configured to receive an analog input signal may receive an analog 4-20 mA signal, determine a parameter value based on the current amplitude of the signal, and transmit the parameter value to a controller or I/O card via a digital communication bus. As a second example, a CHARM configured to transmit an analog or discrete output signal may receive, via a communication bus, a command or parameter value for a target field device and may transmit an analog or discrete signal, via an appropriate I/O channel, to the target field device.

The socket into which a CHARM is inserted includes a terminal block that can be wired to an appropriate field device input/output to communicatively connect the field device to the I/O card 256. The CHARMs 293 effectively replace the terminals 192, the FTAs 194, and the I/O cards 156A-F shown in FIG. 2. Unlike the I/O cards 156 in FIG. 2, the I/O card 256 can connect to the backbone 10 and to any process controller connected to the backbone 10. That is, the I/O card 526 does not have to be assigned to a single controller. One might consider the marshalling cabinet 250 to be a single I/O card capable of connecting to any desired process controller in the plant (e.g, via the link 284 and or to a the backbone 10 shown in FIG. 1), thereby connecting the controller to every field device input and output connected to the cabinet 250. In some instances, the I/O card 256 supports 96 field device signal connections or I/O channels.

Advantageously, the CHARMs 293 enable technicians to wire the field devices 252 to any terminal block without worrying about cross-wiring. The technician can simply wire the field device to a terminal block and insert a CHARM configured for the appropriate signal type, thereby establishing communication between the field device and the I/O card. For example, the field device 252A is configured to transmit an AI signal. Accordingly, a technician may insert the AI CHARM 293A into the terminal block wired to the field device 252A to enable the I/O cards 256 (and, ultimately, the controller 258) to receive the AI signals transmitted by the field device 252A.

As noted, the I/O card 256 may be communicatively connected to each of the CHARMs 293 via a backplane bus. Further, the I/O card 256 may be communicatively connected to the controller 258 via a communication link 284, which may be wired (e.g., an ethernet link) or wireless in nature. In some instances, the link 284 is direct; in other instances, the link 284 may include one or more other links, nodes, and/or networks. For example, the I/O card 256 may be connected to the controller 258 via backbone 10 shown in FIG. 1A. Such implementations enable any C-IO card such as the I/O card 256 to communicate with any appropriately configured controllers, enabling each of these controllers to communicate with any field device connected to those C-I/O cards. This many-to-many mapping between C-I/O cards and controllers offers a number of improvements (e.g., flexibility with redesign and rewiring) over traditional controller and I/O card implementations in which each I/O card is assigned to a particular controller and in which the field devices connected an I/O card can only be controlled via that assigned controller.

Further, unlike the I/O cards 156 shown in FIG. 2, the I/O card 256 is not part of a single assembly with a controller. While the I/O cards 156 generally need to be located where the corresponding controller 158 is located, the I/O card 256 may be remotely located relative to the controller 258 (e.g., within the marshalling cabinet 250 in the field environment). Of course, in some instances the I/O card 256 may share a location with the controller 258, may share an assembly with the controller 258, and may be attached to the same backplane and communication bus as the controller 258. In operation, the I/O card 256 receives, via the backplane bus, signals from one or more of the CHARMs 293 and forwards information carried by the signals to the controller 258. Further, the I/O card 256 may receive from the controller 258 signals carrying messages including commands, and may forward the commands via the backplane bus to the appropriate CHARM (e.g., based on a particular field device or CHARM identified in the message as being associated with the command).

B. The CHARM 293M of the I/O Network 7

Of particular note in the I/O network 7 is the CHARM 293M. Unlike the CHARMs 293A-L, the CHARM 293M is configured for bidirectional communication via an I/O channel coupling one or more field devices to the CHARM 293M. Particularly, the CHARM 293M engages in bidirectional communication via the communication channel 282, which is shown as including two physical links 28A (connecting the field module 191 to one of the terminals 255D of the FJB 254D) and 282B (connecting the terminal 255D to the CHARM 293M).

The CHARM 293M is coupled to field device I/O connectors via the field module 291, and may support as many field device signals as are supported by the field module 291. In a typical example, the field module 291 supports up to eight field device signals, which may be any desired combination of discrete inputs and discrete outputs. In some instances, the field module 291 and CHARM 293M may support four signals, 16 signals, or any other desired number of field device signals.

During operation, the CHARM 293M receives one or more commands for discrete outputs or DOs via a link to the I/O card 256 and/or controller 258 and encodes the commands onto a message (sometimes called a "DO message") that is transmitted via a signal transmitted to the field module 291. For example, with reference to FIG. 3, the CHARM 293M may encode onto a message a first command for the DO 273, a second command for the DO 274, and a third command for the DO 275. Each command may be binary in nature, and thus represented by a single bit. The encoded DO message is transmitted via a signal on the channel 282, and then received and decoded by the field module 291. The field module 291 then routes the commands to the appropriate DOs.

Further, CHARM 293M may receive a message (sometimes referred to as a "DI message") from the field module 291 including information transmitted by one or more field device discrete inputs or DIs (e.g., the DI 276) connected to the field module 291. The CHARM 293M may decode the DI message to identify a variable value or other information from each of the one or more field device DIs connected to the field module 291, and may then forward the received variable values to the I/O card 256 and/or controller 258. In addition to forwarding the variable values, the CHARM 293M may transmit a tag associated with each variable value so that the controller 258 knows which process variable has which value.

As noted, the CHARM 293M is capable of bi-directional communication with the field module 291M. The devices may rely on clock synchronization to alternately send the DI messages and DO messages. Further, communication signals on the channel 282 may be superimposed on DC power that the CHARM 293M provides to the field module 291. The CHARM 293M may source this power from a power bus connecting the CHARM 293M to the I/O card 256. The CHARM 293M may include a coupling circuit to inject communication signals onto the power on the channel 282 and/or a decoupling circuit to separate communication signals from power on the channel 282. Communication between the field module 291 and the CHARM 293M is described in greater detail with reference to FIGS. 9A, 9B, 10A, and 10B.

C. The Field Module 291 of the I/O Network 7

The field module 291 is an electronic process control device, apparatus, or component configured to serve as a communication interface between (i) multiple discrete communication channels connected to field device inputs and/or outputs and (ii) a single discrete communication channel connecting the field module 291 to CHARM, I/O card, and/or controller. The field module 291 may include a housing (not shown), and may be disposed at any suitable location within the process plant 5 (e.g., near a grouping of discrete input and/or output connectors for one or more field devices). Further, the field module 291 may store a profile including a tag unique to the field module 291 and may upload the tag and other profile information to a CHARM, I/O card, and/or controller to facilitate commissioning, configuration, and operation of the connected field devices, signals, and the field module 291. In some instances, the field module 291 provides power to a field device or element receiving a DO signal.

Advantageously, the field module 291 enables "smart commissioning" of discrete input and output signals and field devices in the plant 5. During smart commissioning, tags for the discrete signals are "auto-sensed" via the field module 291 and bound to the physical channels carrying the signals (e.g., via the configuration database 92b), thereby enabling controllers and other devices to reference DI values and/or send commands to field devices via the DO signals by referencing the tags. Previously, smart commissioning and auto-sensing was not feasible with discrete devices and signals. Typical discrete devices are "dumb" in that they are not capable of storing information or sending anything via a discrete signal other than a single binary variable value. Thus, unlike smart field devices configured for messaging via analog signaling (e.g., HART devices), these dumb discrete devices have no way to store or transmit a tag to other devices and consequently are incapable of smart commissioning. Unfortunately, discrete devices such as limit switches and solenoids constitute a significant number of the devices in many plants.

Further, the field module 291 enables discrete devices to communicate via simple DI and DO signals. The field devices do not need to be modified, and from the perspective of the field devices, connecting field wiring at the field device is no different than in traditional systems. In other words, the field module 291 enables smart commissioning while avoiding expensive and complicated retrofitting of the discrete devices. Notably, such retrofitting efforts would likely encounter challenges due to certain discrete devices (notably solenoids) having (i) significant inductance and consequently a tendency to swamp communication signals, and (ii) significant power requirements that traditional communication protocols (such as HART and other analog signaling protocols) are unable to meet.

The field module 291 may include a processor 291A; an I/O interface 291B; a power supply 291C; a memory 291D storing one or more routines 291E and a profile 291F; and/or one or more communication interfaces 291G-I. The processor 291A executes the one or more routines to cause the field module 291 to provide the functionality attributed to the field module 291 in this description. In some cases, the field module 291 additionally or alternatively includes an ASIC (not shown) that provides some of the described functionality of the field module 291.

The power supply 291C provides power to one or more DOs (e.g., the DO 273) connected to the field module 291. In some instances, the field module 291C does not include a power supply, or does not utilize the power supply. For example, the field module 291 may receive power via the channel 282, which can be utilized for both power and data transmission (e.g., a data signal may be superimposed on 24V DC power). The field module 291 may include a coupling circuit to inject communication signals onto the power on the channel 282 and/or a decoupling circuit to separate communication signals from power on the channel 282. The field module 192 may distribute received power to connected DOs needing power. In some implementations, however, the power received from the channel 282 may be insufficient to power every connected to DO, particularly those having high power requirements (e.g., solenoids). In these cases, the power supply 291C provides power to such DOs. In some instances, the power supply 291C shares a housing with other components of the field module 291. In other instances, the power supply 291C is external to the housing.

The communication interface 291G of the field module 291 includes connectors (e.g., terminals) for connecting to the I/O connectors 273-276 of the field device 252k. The field device 252k is wired to the field module 291 in the same manner it might be wired to FJBs or a traditional marshalling cabinet (e.g., each field device I/O terminal or terminal block may be wired to the field module 291 via a two, three, or four wire connection), but in some instances is connected via other means. In some instances, the field module 291 is connected to I/O connectors for multiple field devices (e.g., both of the field devices 2521 and 252K).

The communication interface 291H includes a connector such as a terminal block or port for connecting the communication channel 282 to an FJB, a CHARM, an I/O card, and/or a controller. The single communication channel 282 is generally a serial data transmission channel established via traditional field wiring (e.g., two, three, or four wire connection; twisted pair cabling; fiber optic cabling, etc.) and may include one or more physical links (e.g., connecting the field module 291 to the FJB 254D and connecting the FJB 254D to the marshaling cabinet 250). The link 282 may be established using wiring and connectors conforming to any suitable standard, such as RS-485, RS-422, RS-232, CAT5, CAT6, etc. In some cases the channel 282 includes one or more wireless links.

The communication interface I includes a wireless interface for wirelessly communicating with other devices. Specifically, the interface I supports any suitable standard and protocols for short-range communications, such as NFC, RFID, Bluetooth, etc.

The profile 291F includes one or more system tags unique to the field module 291 and the set of field device channels connected to the communication interface 291G (e.g., the field device 252k and the channels to the connectors 273-276 in this case). In particular, the profile 291F may include a single system tag or device tag and a DST for each of the field device channels connected to the field module 291. For example, each channel to the connectors 273-276 may have a unique DST listed in the profile 291F. Further, the profile 291F may include a mapping of each DST to a particular connector of the interface 291G that corresponds to the DST (e.g., indicating terminal block 1 corresponds to a first DST; terminal block 2 corresponds to a second DST; etc.) and may identify the signal type for each DST. For example, as shown in FIG. 3, the profile 291F indicates that the signal type for the DSTs corresponding to the connectors 273-275 is "DO" and that the signal type for the DST corresponding to the connector 276 is "DI."

The profile 291F of the field module 291 may be updated or replaced via the communication interface 291I. Specifically, a portable device may wirelessly update the profile via a direct, short range, wireless link between the portable device and the field module 291. Updating the profile 291F may be useful when a field device channel to the field module 291 is added, disconnected, or replaced, or when the field module 291 is assigned a new tag (e.g., during project redesign). In particular, rather requiring a technician or engineer to go to a workstation in the back-end environment 125 to update the profile 291F, the wireless updating function enables the technician to quickly and easily update the field module 291 while near the field module 291 in the field environment 122 (e.g., after updating field wiring to add, replace, or remove a channel to a field device), where he is able to visually inspect the field module 291 and confirm or reconfirm that information in the updated profile accurately reflects physical changes to the field module 291. Later, an example portable device and example techniques for updating a field module profile will be described in more detail with reference to FIG. 8A.

As already noted, the field module 291 serves as a communication interface between (i) multiple discrete communication channels connected to field device inputs and/or outputs and (ii) a single discrete communication channel connecting the field module 291 to a CHARM, I/O card, and/or controller. While FIG. 3 shows multiple DO channels and a single DI channel connected to the interface 291G, it will be appreciated that the field module 291 may connect to multiple inputs and/or multiple outputs.

In operation, the field module 291 receives, via the interface 291H and the I/O channel 282, a discrete signal (also referred to as "signal H1") carrying a DO message from the CHARM 293M, the I/O card 256, and the controller 258. The field module 291 analyzes and decodes the message to identify one or more commands included in the message and analyzes a tag-to-message map mapping system tags (e.g., a DST) to the DO message (e.g., indicating bit positions within the DO message corresponding to particular DSTs) so that a DST for a target DO can be determined for each command. The tag-to-message map is generally stored at the profile 291F and uploaded to other devices involved in routing or receiving the DO message, such as the controller 258. In some instances, however, the tag-to-message map may be included in metadata for the DO message. In any event, as an example, the field module 291 may determine from the profile 291F that a first set of bits in the DO message maps to DST "CV-123" and consequently may assign the command or value represented by the first set of bits (e.g., "1") to the DST "CV-123." The field module 291 then forwards the commands to the appropriate field device channels based on a tag-to-DO map (e.g., stored to the profile 291F) mapping each DST to a particular channel or connector of the field module 291. For example, the field module 291 may analyze the profile 291F to determine that the tag-to-DO map indicates DST "CV-123" is mapped to a third terminal block of the field module 291. The field module 291 may consequently transmit appropriate command or value (e.g., 1 n this case) via the third terminal block.

In further operation, the field module 291 forwards, via the I/O channel 282, a DI message carrying one or more variable values or other sets of information that were received via one or more field device channels. For example, when the interface 291G receives multiple DI signals carrying multiple sets of information, the field module 291 generates the DI message, including a payload carrying each of the multiple sets of information. If desired, the field module 291 may also generate a metadata portion including, e.g., delimiters and/or an tag-to-message map mapping system tags (e.g., a DST) to the DI message so that each set of information can be mapped to a particular DST. In some instances, one or more of the DI signals received by the field module 291 represent binary values and consequently may be represented by a single bit in the DI message; in some instances, one or more of the DI signals received by the field module 291 are non-binary and thus represented by more than one bit in the DI message transmitted by the field module 291. Further, as discussed with reference to FIG. 9B, for each variable value or set of information, the field module 291 may encode the DI message with a first set of bits representing the value and a second set of bits representing the bitwise inversion of the value. In any event, the field module 291 transmits the encoded message via the interface 291H and channel 282 so that a CHARM, I/O card, and/or controller can receive the message and information transmitted by the field devices.

The information transmitted by the field devices via the DI signals may represent a number of things. For example, an ON-OFF valve may include a first binary DI configured to have a value of 1 (e.g., a value of 5V for a 1-5V voltage signal) when the valve is open and a second binary DI configured to have a value of 1 to indicate when the valve is closed (generally speaking, a match between these two DIs might indicate that the valve is in the process of positioning or that an error exists). Such a valve may also include an actuator, as well as a first binary DO that causes the actuator to drive the valve open when a value of 1 exists and a second binary DO that causes the actuator to drive the valve closed when a value of 1 exists.

D. The Controller 258 and DIO Element 259F

The controller 258, which is similar to the controller 11 shown in FIG. 1A, implements a control strategy defined by one or more control routines 259D stored to a memory 259A. The controller 258 is communicatively connected to other devices in the I/O network 7 via a link 284, as well as to other various devices in the plant 5 via the backbone 10 (shown in FIG. 1A). The link 284 may include any suitable wired (e.g., Ethernet) or wireless channels. The link 284 couples the controller 258 to the I/O card 256, as well as to the field devices 252 and the field module 291.

During operation, a processor 259B of the controller 258 executes the control routines 259D, which cause the controller 258 to transmit to one of the field devices 252 a control signal over the link 284 to control operation of a process in the plant 5 via control of the field devices 252. The controller 258 may generate a control signal based on one or more signals received via the link 284 (e.g., carrying information transmitted by the field device 252K, the field module 291, the CHARM 293M, and/or the I/O card 256) and logic defined by the control routines 259D.

Each of the control routines 259D may be developed by linking and configuring various control elements or function blocks (FBs) 259E. Generally speaking, each of the FBs 259E represents an input function, a control function, and/or an output function. Examples of these types of blocks and functions are described with reference to FIG. 1B.

The controller 258 includes a DIO element (sometimes called the "DIO control element," "DIO function block," or "DIO block") 259F, which may be utilized along with the FBs 259E to define one or more of the control routines 259D. The element 259F is an object or routine that may be thought of as software representation of the field module 291 and/or CHARM 293M. That is, the DIO element 259F can be included in control routines and referenced to reference the field device signals on the channels 273-276 managed by the field module 291 and the CHARM 293M. Note, an example element similar to the DIO element 259F is later described with reference to FIG. 4B.

During commissioning of the field device 252K, the field module 291, the CHARM 293M, and the signals and channels associated with each of those devices, the controller 258 may "auto-sense" one or more tags for these devices and signals, and may store the tags and bindings for each of the tags (e.g., at the memory 259A and/or at the configuration database 72b shown in FIG. 1A). These bindings map each tag to a particular I/O channel or subchannel or to a hardware address linked to the I/O channel or subchannel.

The bindings allow devices in the plant to read and transmit information (e.g., measurements, indices, commands) by reading and writing to tags unique to the signals carrying variable values and commands. Any desired device in the plant 5 may utilize the tags for reading and writing functions, such as the controller 258, the controller 11, the workstations 71, the historians 73, one or more of the field devices 252, etc.

The hardware address in the binding may identify a particular terminal block address and/or a particular address for a CHARM 293 to which a channel and device are connected. For example, a hardware address may take form of "controller.card.CHARM." For example, the field module 291 may have an address that looks something like "Controller 258→I/O card 256→CHARM 293M." In such an example, each CHARM may have an associated terminal block address or I/O channel address. Generally speaking, each I/O channel extending from a marshaling cabinet to a field device or field module corresponds to a terminal block (i.e., channel 1=terminal block 1; channel 2=terminal block 2; etc). If desired, the hardware address may take the form of "controller.card.channel" and/or the form of "controller.card.channel.subchannel." As used herein, a "sub-channel" of an I/O channel refers to a channel between a field module and a connected field device I/O connector, and is sometimes simply referred to as a "channel" or "I/O channel." Each of the channels for the I/O connectors 273-276 is a sub-channel of the I/O channel 282.

In any event, the controller 258, in conjunction with the I/O card 256 and the CHARM 293M, may auto-sense a tag stored to the profile 291F of the field module 291, enabling the auto-sensed tag to be bound to the appropriate hardware address and enabling the field device 252K, the field module 291, the CHARM 293M, and channels/signals between each of these devices to be commissioned as soon the communication links between the devices are installed and functioning. This auto-sensing function saves technicians from having to manually identify hardware addresses and manually create bindings to the appropriate tags, a process that is prone to human error and that creates challenges if changes in field wiring are necessary.

Notably, the field module 291 can be disconnected from the terminal block tied to the CHARM 293M and coupled to a new terminal block in the marshaling cabinet 250 or to a new terminal block in a different marshaling cabinet with a different I/O card and different controller. For example, when the CHARM 293M is inserted into a socket that couples the CHARM 293M to the new terminal block, the CHARM 293M auto-senses the tag for the field device 291 and the binding for the tag is updated. For example, the I/O card 256 or the new I/O card may communicate with the CHARM 293M to identify the new terminal block or I/O channel for the CHARM 293M, and may cause the binding to be updated with the new hardware address. As another example, a second DIO CHARM may be inserted into the new socket, autosense the tag for the field module 291, and update the binding to reflect the new hardware address.

The ability of the DIO CHARMs (e.g., the CHARM 293M) and the CHARM I/O cards to autosense a tag of a field module and to automatically update a binding for the tag enables easy and fast reconfiguration and rewiring of the I/O networks. By contrast, manual commissioning is error prone and requires significant time and effort from technicians who not only have to spend time rewiring, but who rely on manually kept records that may not be updated. For example, in manual commissioning, a device may be wired to a terminal block connected to the wrong I/O card and/or wrong controller, preventing the appropriate controller from communicating with the device and from implementing control routines involving that device. As another example, a technician may simply update a binding for the device with an incorrect hardware address, making it impossible for other devices to reference the device via its unique tag. The DIO CHARMs and field modules described herein eliminate this process by enabling autosensing of field module tags and automatic binding updates. Autosensing techniques are later described in more detail with reference to FIG. 6.

The controller 258 also includes an auto configuration routine 259G that enables the controller 258 to automatically instantiate and configure a DIO control element or function block for every connected field module. These DIO elements are objects or routines that may be thought of as software representations of a field module or DIO CHARM. That is, every discrete input and output channel between one or more field devices and a field module may be accessed (e.g., by a control routine) via a corresponding DIO element such as the DIO element 259F. In any event, the auto configuration routine 259G automatically configures DIO elements. For example, the execution of the routine 259G may cause the controller 258 to download the profile 291F from the field module 291 and to bind the appropriate tags (e.g., system tags and/or signal tags) to inputs and outputs of the DIO element 259F. Thus, the auto-configured DIO element 259F may be bound to a system tag for the field module 291 and may have three control element or function block inputs (e.g., representing fields that other blocks can write to and thereby control corresponding DO signals) bound to signal tags for the DOs 273-275 and one control element or function block output bound to signal tags for the DI 276 (e.g., representing a field that other blocks can read to thereby access the value of the corresponding DI signal). An example technique for auto configuring DIO element in accordance with the routine 259G will be described in subsequent sections with reference to FIG. 7.

E. A DIO Control Element Template 450

Figure 4A:
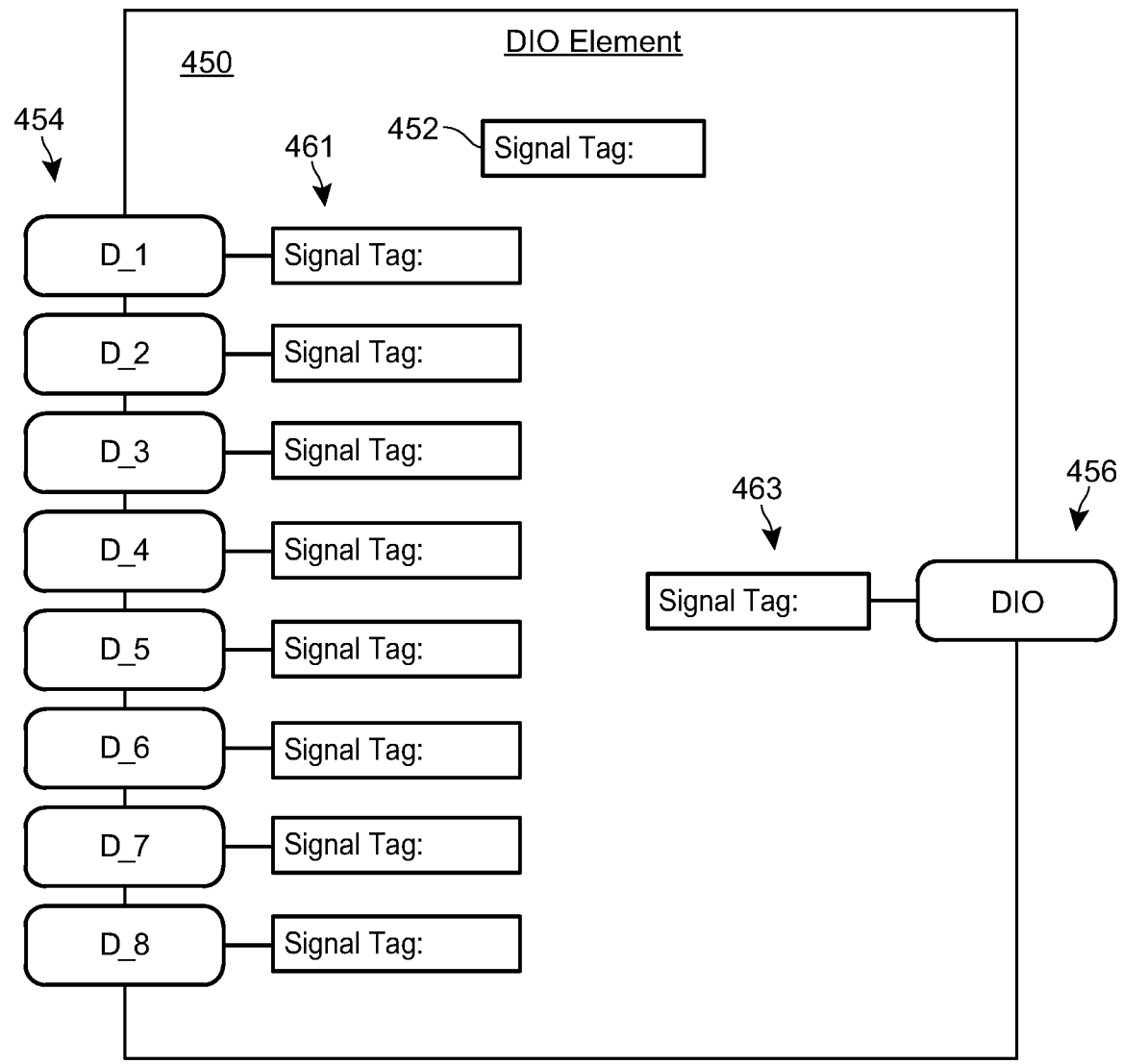
FIG. 4A shows an unconfigured DIO control element created from a template that may be utilized to create instances of a DIO control element, such as the DIO element shown in FIG. 3.

FIG. 4A shows an unconfigured DIO control element 450 created from a template (not shown) that may be utilized to create one or more instances of a DIO control element, such as the DIO element 259F shown in FIG. 3. A user may instantiate and configured the DIO control element 450 utilizing any suitable configuration and design system, such as the configuration application 72a executing on any suitable computing device. The DIO control element 450 may be configured and linked to other input blocks, function blocks, and/or output blocks to create a routine in a manner similar to that described with reference to the routine 101 shown in FIG. 1B.

Generally speaking, the element 450 is a software representation of a field module such as the field module 291. The element 450 may be bound to a particular field module by entering the field module's system tag in the field 452. For example, the DIO element 259F is bound to a tag unique to the field module 291 (e.g., FM-9872).

As shown, the element 450 has eight discrete inputs or outputs 454 and a hybrid discrete input/output (DIO) 456. Each of the I/O 454 corresponds to a particular terminal or terminal block of the field module 291. By entering a signal tag in one of the fields 461, a user may bind the corresponding discrete input or output 454 to the signal associated with the signal tag. For example, the DIO element 259F includes an input bound to a signal tag (e.g., FM-9872-CMD-OPEN) unique to the signal transmitted from the field module 291 to the DO 273. Each field module may include a profile indicating which terminal or terminal block of the field module is mapped to a particular signal tag.

Finally, the hybrid DIO 456 corresponds to a particular channel, such as the channel 282 shown in FIG. 3, between the bound field module and a CHARM, I/O Card, and/or controller. By entering a signal tag in a field 463, the DIO 456 can be bound to the CHARM, I/O Card, and controller associated with the field module. For example, the DIO element 259F includes a hybrid DIO 456 bound to a signal tag representing the channel 282. In some instances, because each field module has a single hybrid DIO 456, the element 450 may auto populate the field 463 and/or auto bind the appropriate channel when a system tag is bound to the element 450. Further, in some instances the signal tag for the hybrid DIO 456 may be the same as the system tag for the element 450. It will be appreciated that, depending on the circumstances, the element 450 may include any suitable number of discrete inputs, any suitable number of discrete outputs, and any suitable number of discrete hybrids. Further, the element 450 may include no discrete inputs, no discrete outputs, or no discrete hybrid inputs/outputs if desired.

Figure 4B:
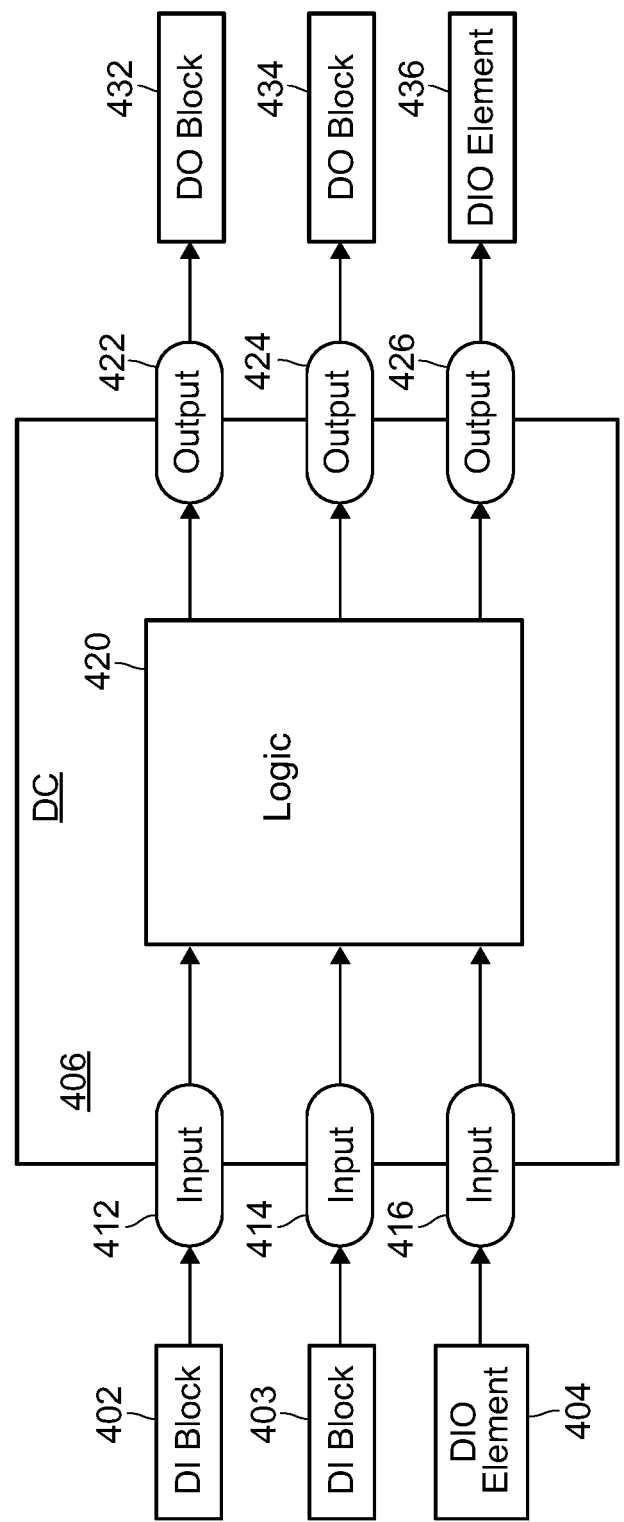
FIG. 4B shows a control routine including a discrete control (DC) function block that may be linked to one or more other blocks, such as the DIO element shown in FIG. 4A, and that may receive discrete input signal(s) from linked block(s) and that may provide discrete output signals to linked block(s) based on logic executed by the DC function block.

FIG. 4B shows a control routine 401 including a discrete control (DC) function block 406 that may be linked to one or more other blocks, such as the DIO element 450 shown in FIG. 4A, to receive discrete input signals and to provide discrete output signals.

Specifically, the control routine 401 includes: (i) a set of input blocks 402-404 providing discrete input signals to a set of discrete inputs 412-416 of the DC block 406, including a DI 402, a DI 403, and a DIO element 404; and (ii) a set of output blocks 432-436 receiving discrete output signals from the discrete outputs 422-426 of the DC block 406, including a DO 432, a DO 434, and a DIO element 436. While FIG. 4B shows the DC block 406 including three discrete inputs 412-416 and three discrete outputs 422-426, the DC block 406 may include any desired number of discrete inputs, each linkable to any desired block capable of providing a discrete signal (e.g., a standard DI block or a DIO element such as the DIO element 450 shown in FIG. 4A); and may include any desired number of discrete outputs, each linkable to any desired block capable of receiving a discrete signal (e.g., a standard DO block or a DIO element such as the DIO element 450).

Each of the input blocks 402-404 and the output blocks 432-436 may be bound to or associated with any suitable device tag or signal tag that is associated with a process control entity (e.g., a field device or a field module) configured to transmit or receive a signal of the appropriate type. For example, each of the input blocks 402-404 each may be bound to or associated with one or more of: (i) a device tag for a process control entity capable of transmitting a discrete input signal, or (ii) a signal tag for a particular discrete input signal transmitted by a field device. To illustrate, the block 402 or block 403 may be bound to a device tag for the field device 152K shown in FIG. 2 or a signal tag for the DI 176 of the field device 152K. Further, the DIO element 404, which is similar to the DIO element 450 shown in FIG. 4A, may be bound to or associated with any suitable device tag or signal tag associated with a field module (e.g., a tag associated with the field module 291 shown in FIG. 3 or the DI 276 of the field module 291).

After binding the input blocks 402-404 to tags associated with process control entities and particular signals, each relevant process control entity transmits to an I/O card or controller a signal carrying a discrete parameter value. The controller associates the discrete parameter value with a signal tag or a device tag that has been "bound" to the transmitting process control entity and signal. Then, the input block 402-404 to which the signal tag or device tag has been "bound" provides the discrete parameter value to the relevant block(s) when the control routine 401 is implemented.

As a further example, each of the output blocks 432-436 may be bound to or associated with one or more of: (i) a device tag for a process control entity capable of receiving a discrete output signal, or (ii) a signal tag for a particular discrete output signal transmitted to a field device. To illustrate, the block 432 or the block 434 may be bound to a device tag for the field device 252E shown in FIG. 2, or may be bound to a signal tag for the DO 265 of the field device 252E. Further, the DIO element 436, which is similar to the DIO element 450 shown in FIG. 4A, may be bound to or associated with any suitable device tag or signal tag associated with a field module (e.g., a tag for the field module 291 shown in FIG. 3 or for the DO 273 of the field module 291).

After binding the output blocks 432-436 to tags associated with process control entities, the output blocks 432-436 receive discrete parameter values from the outputs 422-426 of the DC block 406 during execution of the routine 401. A controller executing the routine 401 then causes signals carrying the discrete parameter values to be transmitted (e.g., via I/O cards such as the I/O cards 256A and 256B shown in FIG. 3 or the I/O cards 26 and 28 shown in FIG. 1A) to the corresponding process control entities (e.g., field devices or field modules) that are bound to the output blocks 432-436.

The control routine 401 (including any logic or passing of information associated with the blocks 402-406 and 432-436) is executable by any suitable processor or controller, such as the controller 11 shown in FIG. 1A or the controller 258 shown in FIG. 3. The control routine 401 may be created in a manner similar to that described with reference to the routine 101 shown in FIG. 1B (e.g., via the application 72a shown in FIG. 1A), and may be similar in nature to the routine 101.

Regarding functionality, the DC block 406 performs logical operations utilizing parameter values received via the set of discrete inputs 412-416 to generate or calculate parameter values or commands that the DC block 406 transmits via the set of discrete outputs 422-426 to other blocks (e.g., the blocks 432-436 in the shown example). The logical operations performed by the DC block 406 may represent any desired logic or routine a designer wishes to be implemented by the DC block 406.

F. The CHARM 293M and a Marshalling Block 140

Figure 5:
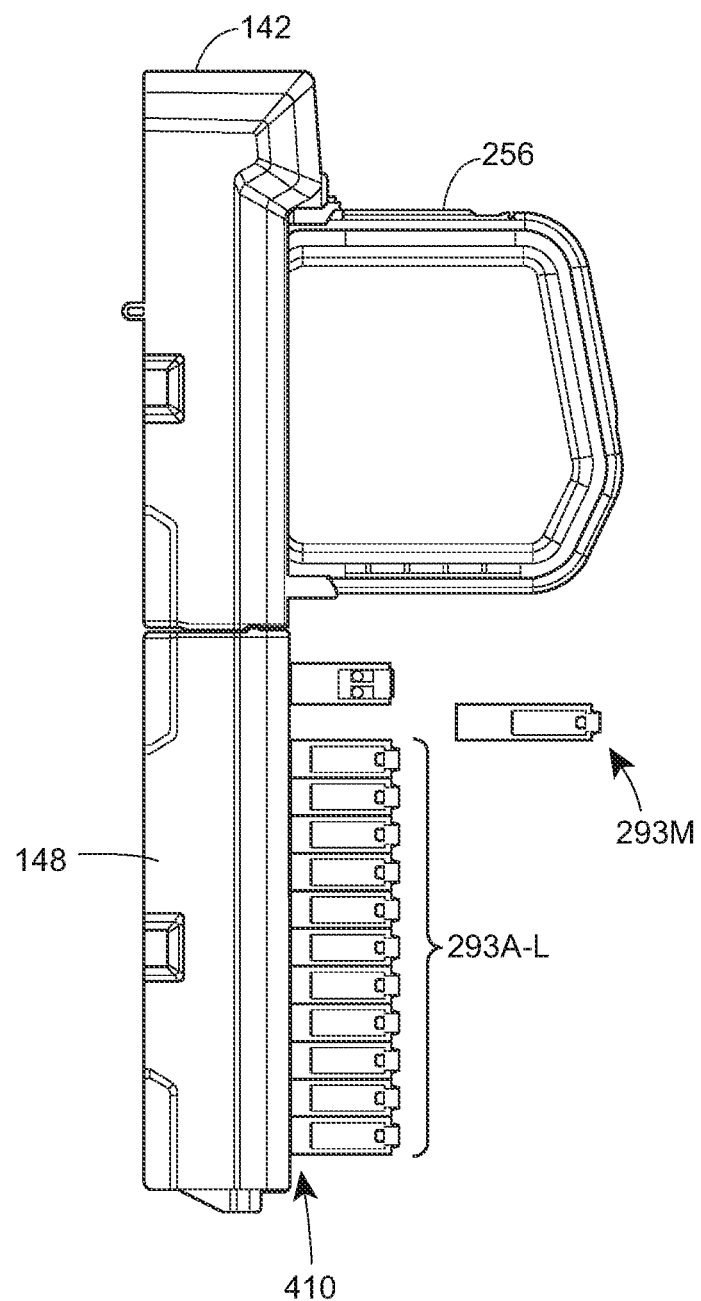
FIG. 5 illustrates a profile view of an example electronic marshalling block or apparatus that supports the electronic marshalling component shown in FIG. 3.

With particular regard to the CHARM 293M, FIG. 5 illustrates a profile view of an example electronic marshalling block or apparatus 140 that supports the electronic marshalling component 293M shown in FIG. 3. In FIG. 5, the electronic marshalling block or apparatus 140 includes a CHARM carrier 142 that supports one or more of the CHARM I/O cards (CIOCs) 256 (also shown in FIG. 3) to which the process controller 258 may be connected (e.g., via the wired or wireless connection 284 shown in FIG. 3). Additionally, the electronic marshalling block or apparatus 140 includes one or more CHARM baseplates 148 that communicatively connect to the CHARM carrier 142 (and therefore, to the CHARM I/O cards 256), and that support a plurality of individually configurable channels.

Each channel corresponds to a dedicated CHARM terminal block 410 into which the CHARM 293M (or any other CHARM) may be securely received and electronically connected, thereby electronically marshalling the field module 291 (shown in FIG. 3), the field device I/O connected to the field module 291 (e.g., the connectors 273-276 of the field device 252k shown in FIG. 3), and the I/O card 256 with the controller 258.

IV. Smart Commissioning Techniques

Figure 6:
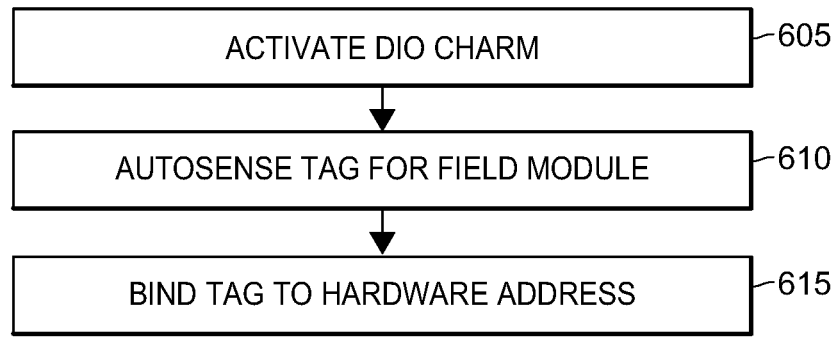
FIG. 6 is a flow chart of an example method of smart commissioning a field module such as the field module shown in FIG. 3.
Figure 7:
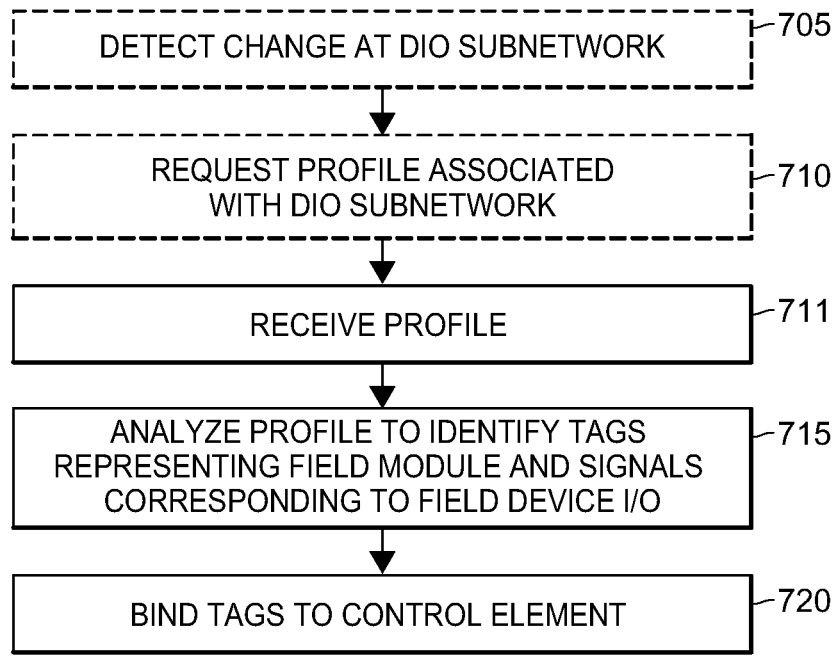
FIG. 7 is a flow chart of an example method of automatically configuring a control element, such as the one shown in FIG. 3, associated with a field module and one or more discrete inputs or outputs for field devices.

With reference to FIGS. 6-8, example techniques and systems are described that may be utilized to facilitate smart commissioning and configuration of discrete elements in a process plant such as the plant 5. In particular, with reference to FIG. 3, the described techniques and system can be utilized for smart commissioning of: discrete field devices such as the field device 252K; discrete I/O subchannels such as those connected to the I/O connectors 273-276 of the field device 252K; field module devices such as the field module 291; and DIO CHARMs such as the DIO CHARM 293M.

Figure 8A:
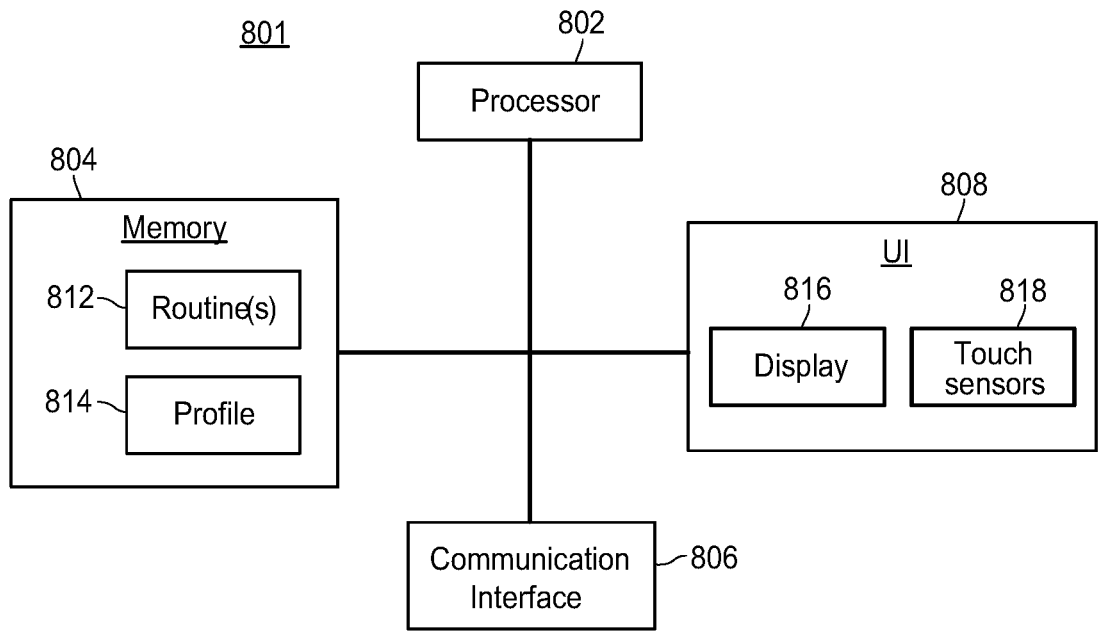
FIG. 8A is a block diagram of an example portable device that may be utilized to update a profile of a field module such as the field module shown in FIG. 3.

The description below references: (A) FIG. 6, depicting a method of smart commissioning a field module; (B) FIG. 7, depicting a method of automatically configuring a control element or function block associated with a field module; and (C) FIG. 8A, depicting an example portable device configured to update a profile of a field module.

A. A Method of Smart Commissioning a Field Module

FIG. 6 is a flow chart of an example method 601 of smart commissioning a field module. Generally speaking, devices in the I/O network 7 of the plant 5 implement the method 601 to commission field modules such as the field module 291, as well as discrete field devices and signals associated with the field modules. The method 601 allows software configuration tasks to be separated from hardware installation tasks during commissioning and thereby addresses problems with project execution and late project changes. While the method 601 is described with reference to the field module 291, DIO CHARM 293M, and controller 258 shown in FIG. 3, it will be appreciated that similar field modules, DIO CHARMs, and controllers may implement the described functionality.

The method 601 begins at a step 605 when the CHARM 293M is activated. The CHARM 293M may be activated by communicatively connecting the CHARM 293M to both the field module 291 and the controller 258. Typically this connection is achieved by inserting the CHARM 293M into a socket of the baseplate 148 of the apparatus 140 shown in FIG. 5. By inserting the CHARM, a first communication interface of the CHARM 293M is coupled (e.g., via electrical contacts) to I/O connectors (e.g., a terminal block) of the apparatus 140 to which the channel 282 and field module 291 are linked.

Further, the insertion causes a second communication interface of the CHARM 293M to be connected (e.g., via electric contacts) to a communication link to the I/O card 256. This link may be a powered bus that provides power to the CHARM 293M, as well as a communication channel by which the CHARM 293M can communicate with the I/O card 256 and the controller 258. In some instances, the first or second communication interface of the CHARM 293M may be wirelessly connected to the communication links to which the field module 291, the I/O card 256, or the controller 258 are coupled. In such instances, inserting the CHARM 293M into a socket of the baseplate 148 of the apparatus 140 may trigger the CHARM 293M or the apparatus 140 to establish the one or more wireless connections.

In any event, at a step 610, the CHARM 293M autosenses a tag for the field module 291. Typically, the tag is a logical identifier that, with reference to a set of system tags utilized by the system 5, uniquely identifies the field module 291. For the sake of illustration, the tag stored to the profile 291F and autosensed by the CHARM 293M will be described as being the set of characters "FM-291," but the tag may have any other suitable combination of characters resulting in a unique tag. Note, the autosensed tag sometimes may be called a "device tag" or, more generally, a "system tag" (a term that may encompass device tags as well as signal tags).

Regardless, the autosensing generally occurs after both the CHARM 293M and the field module 291 have been installed and activated. To facilitate the autosensing, one or both of the CHARM 293M and the field module 291 may be configured to periodically transmit a beacon via the channel 282. When the CHARM 293M receives a beacon from the field module 291 (e.g., shortly after the field module 291 is installed, coupled to the CHARM 293M, and activated), the CHARM 293M responds by requesting a tag (e.g., a system tag or device tag unique to the field module 291) or profile for the field module 291. The field module 291 responds to the request by transmitting to the CHARM 293M: (i) a tag stored at the profile 291F, (ii) a portion of the profile 291F, or (iii) the entire profile 291F. Similarly, the field module 291 may transmit any of this information in response to receiving a beacon from the CHARM 293M (e.g., shortly after the CHARM 293M is inserted and activated).

At a step 615, after the CHARM 293M receives the tag "FM-291" and/or the profile 291F, the tag is bound to a hardware address particular to the CHARM 293M and/or channel 282, enabling the controller 258 and other devices to communicate with the devices in the I/O subnetwork 299 (e.g., the field module 291) by referencing the tag "FM-291." The binding may be stored to the configuration database 72b shown in FIG. 1A. Bindings and hardware addresses are described in further detail with reference to FIG. 3.

Note, in some instances the CHARM 293M autosenses additional tags. In particular, in addition to sensing the device tag or DT particular to the field module 291 (e.g., "FM-291"), the CHARM 293M may autosense signal tags or DSTs representing the signals on the I/O subchannels connected to the field module 291 (e.g., the three DO signals and the DI signal on the subchannels between the I/O connectors 273-276 and the field module 291). Each of the autosensed DSTs generally corresponds to: (i) a particular parameter measured, detected, or other reported by a field device (represented by a DI signal), or (ii) a particular command that can be issued to a field device by driving a DO signal to a logical "1."

As already noted with reference to the configuration database 72b shown in FIG. 1A, the DSTs may include the DT of the field module 291. For example, the CHARM 293M may autosense a DST "FM-291-CV-101" corresponding to the DI 276 and representing a status indicator for a control valve (e.g., indicating the valve is open or closed) and/or a DST "FM-291-CO-374" corresponding to the DO 273 and representing a signal that can be driven to a logical "1" to drive a control valve open.

B. A Method of Automatically Configuring a Control Element or Function Block Associated with a Field Module FIG. 7 is a flow chart of an example method 701 of automatically configuring a control element associated with a field module and one or more discrete inputs or outputs for field devices. Generally speaking, devices in the I/O network 7 of the plant 5 implement the method 701 to generate a software representation of a particular field module, having discrete inputs and outputs corresponding to those of the field module. The method 701 saves engineers or designers from having to manually configure a control element for every field module found in a process plant, which may number in the hundreds or thousands). While the method 701 is described with reference to the field module 291, DIO CHARM 293M, and controller 258 shown in FIG. 3, it will be appreciated that similar field modules, DIO CHARMs, and controllers may implement the described functionality.

The method 701 begins at a step 705 when the controller 258 first detects the DIO network 299, or when the controller 258 detects a change to the DIO network 299. The controller 258 may detect the DIO network 299 when the CHARM 293M is inserted into the apparatus 140 and/or when the field module 291 is connected to the CHARM 293M.

At a step 710, the controller 258 requests a profile associated with the DIO network. In particular, the controller 258 may cause the I/O card 256 and the CHARM 293M to retrieve the profile 291F and to transmit the profile 291F to the controller 258.

As indicated by the dashed outline of the blocks 705 and 710, in some instances the controller 258 does not implement the steps 705 and 710. Instead, the CHARM 293M and/or I/O card 256 may detect changes to the subnetwork 299 and may transmit the profile 291F to the controller 258 without having received a request from the controller 258. The CHARM 293M may detect changes to the subnetwork 299 by periodically verifying that the profile 291F at the field module 291 matches the most recently uploaded profile and/or by receiving a notification pushed by the field module 291 after the profile 291F has been updated. The CHARM 293M may autosense tag changes at the profile 291F in accordance with the method 601 described with reference to FIG. 6.

In any event, at a step 711, the controller 258 receives the profile 291F for the field module 291 from the I/O card 256 and CHARM 293.

At a step 715, the controller 258 analyzes the profile 291F to identify tags representing the field module 291 (e.g., "FM-291") and the signals on I/O subchannels between (i) the field module 291 and (ii) the field device I/O connectors 273-276 connected to the field module 291.

At a step 720, the controller 258 instantiates the DIO control element 259F and binds the element 259F to the device tag "FM-291." Further, the controller 258 binds a signal tag for the DI 276 (identified from the profile 291F) to an output of the DIO control element and binds signal tags for the DOs 273-275 to three inputs of the DIO control element. If desired, the controller 258 may also bind a signal tag for the channel 282 to a hybrid input/output of the element 259F. After binding the tags to the element 259F, the element 259F may be inserted into a control routine and linked to other blocks (e.g., input, output, or control blocks) to write to any of the DOs 273-275 and/or to read the DI 276.

Note, the field module 291 may generate information distinct from that carried by discrete signals 273-276. For example, the field module 291 may generate a health index value representing the health of the field module 291, one or more communication status indicators representing the status of any I/O subchannels or of the channel 282, one or more error parameters to indicate malfunctioning at the field module 291, etc. If desired, each of these other parameters or indices may be bound to an output of the element 259F.

After the DIO element 259F has been configured, the controller 258 may periodically send a request to the field module 291 to confirm that the profile 291F has not changed since the element 259F was last configured. If the controller 258 receives notification that the profile 291F has changed (step 705), the controller 258 may again implement steps 710-720.

C. An Example Portable Device Configured to Update a Profile of a Field Module

FIG. 8A is a block diagram of an example portable device 801 that may be utilized to update a profile of a field module such as the field module 291. While the device 801 is described with reference to the field module 291 shown in FIG. 3, the device 801 may similarly interact with any suitable field module in accordance with the described operations.

The device 801 enables a person in the field environment 122 to quickly and easily update the field module 291 while near the field module (e.g., after updating field wiring to add, replace, or remove a channel to a field device) rather than requiring the person to return to a workstation in the back-end environment 125 of the plant. Thus, the device 801 enables the person to visually inspect the field module 291 and confirm or reconfirm that information in the updated profile accurately reflects the physical changes to the field module 291. The portable device 801 may be specifically configured for operation in a process control environment. For example, the portable device 801 may be intrinsically safe. That is, the device 801 may be configured to safely operate in a hazardous area (e.g., an area with dangerous concentrations of flammable gases or dust) by way of having only components that do not possess or emit energy sufficient for ignition in the area (e.g., all components may be configured maintain voltages below 24 VDC and currents below 100 mA). As another example, the portable device 801 may be configured to provide an operator or maintenance display that enables the user of the device 801 to monitor equipment and variables in the plant 5 or to manipulate variables or equipment in the plant 5 to implement control of the plant 5.

The portable device 801 is a portable electronic device such as a laptop, tablet, mobile phone, PDA, or industrial communicator that is configured to update the profile 291F of the field module 291. The device 801 includes a processor 802 (which may be any suitable microprocessor or general purpose processor) communicatively connected to a memory 804, a communication interface 806, and a user interface (UI) 808. The device 801 may also include a housing and power source such as a battery (not shown).

The memory 804 may be any suitable memory and/or storage component including non-transitory computer-readable media ("CRM"), and may include volatile and/or non-volatile media and removable and/or non-removable media. The memory 804 stores one or more routines 812 that may be executed by the processor 802 to cause the device 801 to perform the functionality that is described and attributed to the device 801. The memory 804 also stores a profile 814 for the field module 291.

The communication interface 806 may be any suitable interface that enables the device 801 to send information or data to other system and/or receive information or data from other systems. In particular, the interface 806 includes circuitry for establishing a direct wireless connection (e.g., via NFC) with the field module 291. For example, the interface 806 may include an NFC tag, an NFC reader/writer, a non-NFC RFID tag, and/or a RFID reader/writer. If desired, the interface 806 includes circuitry for wirelessly connecting to one of the access points 55a or 55b and/or circuitry for establishing a wired connection to the field module 291 (e.g., via USB, Ethernet, etc.).

The UI 808 may include any suitable user input component or user output component. As shown, the UI 808 includes a display 816, which may be an LCD display, a smart watch display, a headset display (e.g., VR goggles), any other suitable display, or some combination thereof. The UI 808 also includes touch sensors 818, which may be resistive or capacitive touch sensors that are integrated with the display 816 or with one or more surfaces of "soft keys." If desired, the UI 808 may include buttons and other mechanical actuators that can be utilized for input, as well as any suitable audio or visual output components.

During operation, a user of the device 801 configures the profile 814 (e.g., via the UI 808) to include information she wants to be included in the profile 291F of the field module 291. This configuration may involve providing a device tag for the module 291 and/or a signal tag for one or more I/O subchannels from the field module 291 to a field device connector. In some cases, the device 801 may simply download the profile 814 in a pre-configured state from a server in the back-end 125 (e.g., a server coupled to the database 72b, which may store the preconfigured profile 814).

In any event, after the profile 814 is configured and ready for download to the field module 291, the device 801 detects the field module 291 or the field module 291 detects the device 801, a communication channel is established, and all or some of the profile 814 is downloaded to the field module 291 to replace the profile 291F.

As a first example configuration, the device 801 includes an RFID or NFC reader/writer that detects a passive RFID tag or NFC tag (sometimes simply called an "RF tag") of the field module 291. For example, the device 801 may generate a magnetic field that powers the NFC tag or RFID tag of the field module 291 when a technician places the device 801 in close proximity to the tag of the field module 291 (e.g., within four inches). The NFC or RFID tag may then transmit a signal carrying information that enables the device 801 to bootstrap a link to the field module 291 via a second set of protocols or standards, such as Bluetooth or Wi-Fi direct. In some cases, the field module 291 may instead utilize an active or powered RFID tag, thereby extending the range of potential connection to up to 15 feet.

In some cases, the RFID or NFC tag of the field module 291 stores and transmits the system tag of the field module 291. In such cases, the device 801 may utilize the reader/writer to write a new system tag to the NFC or RFID tag and to thus update the system tag of the field module 291. This operation is useful if the profile 291F has not yet been configured to have a system tag or if project changes require that the field module 291 be assigned a different tag. Further, the field module 291 may have an NFC or RFID tag for each potential I/O subchannel to a field device; the device 801 can write to each of these and thereby update the signal tag stored in the profile 291F for each I/O subchannel.

In a second example configuration, the field module 291 may include an RFID or NFC reader/writer and the device 801 may include an NFC tag and a passive or active RFID tag. In such cases, the reader/writer of the field module 291 may detect a signal transmitted by the RFID or NFC tag of the device 801 (e.g., after being powered by a magnetic field provided by the reader/writer of the field module 291). The field module 291 may rely on this information to bootstrap a second link in a manner similar to that described in the first example.

In some cases, the device 801 may store a desired system tag or signal tag to the RFID or NFC tag, which may then be transmitted when the RFID or NFC tag is powered. The field module 291 may receive the system tag and update the profile 291F accordingly.

In a third example configuration, the field module 291 and the device 801 each may include an NFC reader/writer capable of detecting one another and establishing an NFC peer-to-peer (p2p) connection. The device 801 may transmit all or some of the profile 814 to the field module 291 via this NFC p2p connection to replace the profile 291F.

If desired, the device 801 may establish an indirect connection to the field module 291 (e.g., via the access points 55a, 55b, or 74, the backbone 10, and the I/O network 7) and may download all or some of the profile 814 to the field module 291 via this indirect connection. In some cases, the configuration application 72a or a server may act as an intermediary between the portable device 801 and the field module 291.

Figure 8B:
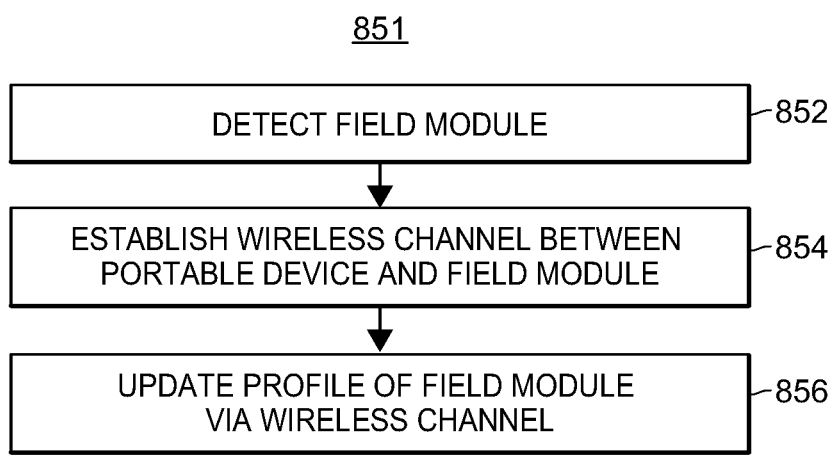
FIG. 8B is a flow chart of an example method of updating a profile utilizing a portable device such as the one depicted in FIG. 8A.

FIG. 8B is a flow chart of an example method 851 of updating a profile (e.g., the profile 291F) at a field module (such as the field module 291 shown in FIG. 3) utilizing the portable device 801 shown in FIG. 8A.

The method 851 begins at a step 852 in which the portable device 801 detects the field module 291. The portable device 801 may automatically and wirelessly detect the field module 291 without input from a user. Any suitable short range, medium range, or long range wireless standard or protocol may be used for detection. For example, as noted above, NFC, RFID, or Bluetooth protocols may be utilized by the device 801 and field module 291 to facilitate detection. The detection may be achieved using wireless signals in any one or more of the 13.56 MHz, 900 MHZ, 2.4 GHz, 3.6 GHz, 5 GHZ, or 60 GHz radio frequency bands. In some implementations, user input may facilitate detection. For example, a user may select a tag, identifier, or graphic, displayed by the device 801 that is uniquely associated with the field module 291. This user interaction may cause the device 801 to attempt to wirelessly detect the field module 291.

At a step 854, the device 801 establishes a wireless channel between the device 801 and the field module 291. Any suitable short range, medium range, or long range wireless standard or protocol may be used for the communication channel. Further, the wireless channel may conform to any one or more of the 13.56 MHz, 900 MHZ, 2.4 GHZ, 3.6 GHz, 5 GHZ, or 60 GHz radio frequency bands. In some implementations, the wireless channel conforms to a different protocol or protocols than the protocol(s) used to detect the field module 291. For example, the field module 291 may be detected via RFID communications, which may be utilized to bootstrap a wi-fi, Bluetooth, or some other wireless communication channel. That said, in some implementations, the wireless channel conforms to the same protocol or protocols used for detection (e.g., NFC may be used for both detection and subsequent communications). In some examples, user input at the device 801 may facilitate establishing the communication channel. For example, the device 801 may first detect the field module 291, and the user may then select the field module 291 via the UI 808 to indicate that he or she wants to establish communication with the field module 291. For example, the device 801 may detect multiple field modules and the user may select a particular field module with which to establish communication.

At a step 856, the device 801 updates the profile of the field module 291 via the established wireless channel. For example, the device 801 may transmit a request to the module 291 for the profile. The module 291 may then respond to the request by transmitting the profile to the device 801.

After the device 801 receives the profile, it may update information stored at the profile. For example, it may change a device tag for the module 291 or may change one or more signal tags for signals transmitted to or received by the module 291. After updating the profile, the device 801 may transmit the profile back to the module 291 (e.g., along with a command to overwrite the old profile or to otherwise active the new or updated profile). User input at the UI 808 may cause or otherwise facilitate the device 801 uploading the profile to the module 291 (e.g., by interacting with a button or other UI element that initiates the uploading). The ability to update the profile of the module 291 enables plant personal to quickly and easily reconfigured the module 291 (e.g., when it is necessary to connect the module 291 to additional or different field devices or field device signals).

V. An Improved Discrete I/O Communications Protocol for Process Plants

Figure 9A:
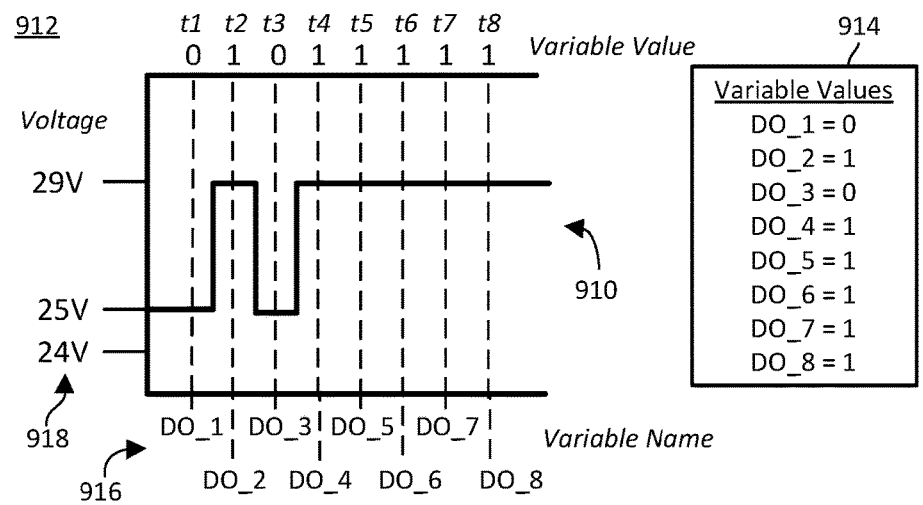
FIG. 9A depicts an example data or communications signal that may be carried by a channel connecting the field module and DIO CHARM shown in FIG. 3, and that may be encoded, decoded, transmitted, or received according to a first protocol.
Figure 9B:
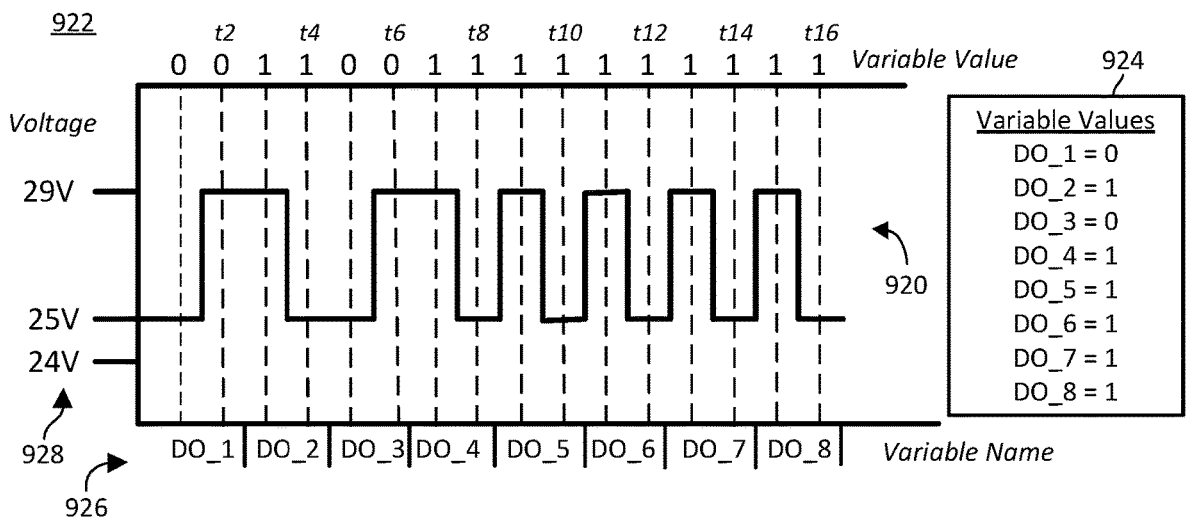
FIG. 9B depicts an example data or communications signal that may be carried by a channel connecting the field module and DIO CHARM shown in FIG. 3, and that may be encoded, decoded, transmitted, or received according to a second protocol that offers a number of advantages over the first protocol shown in FIG. 9A.
Figure 10A:
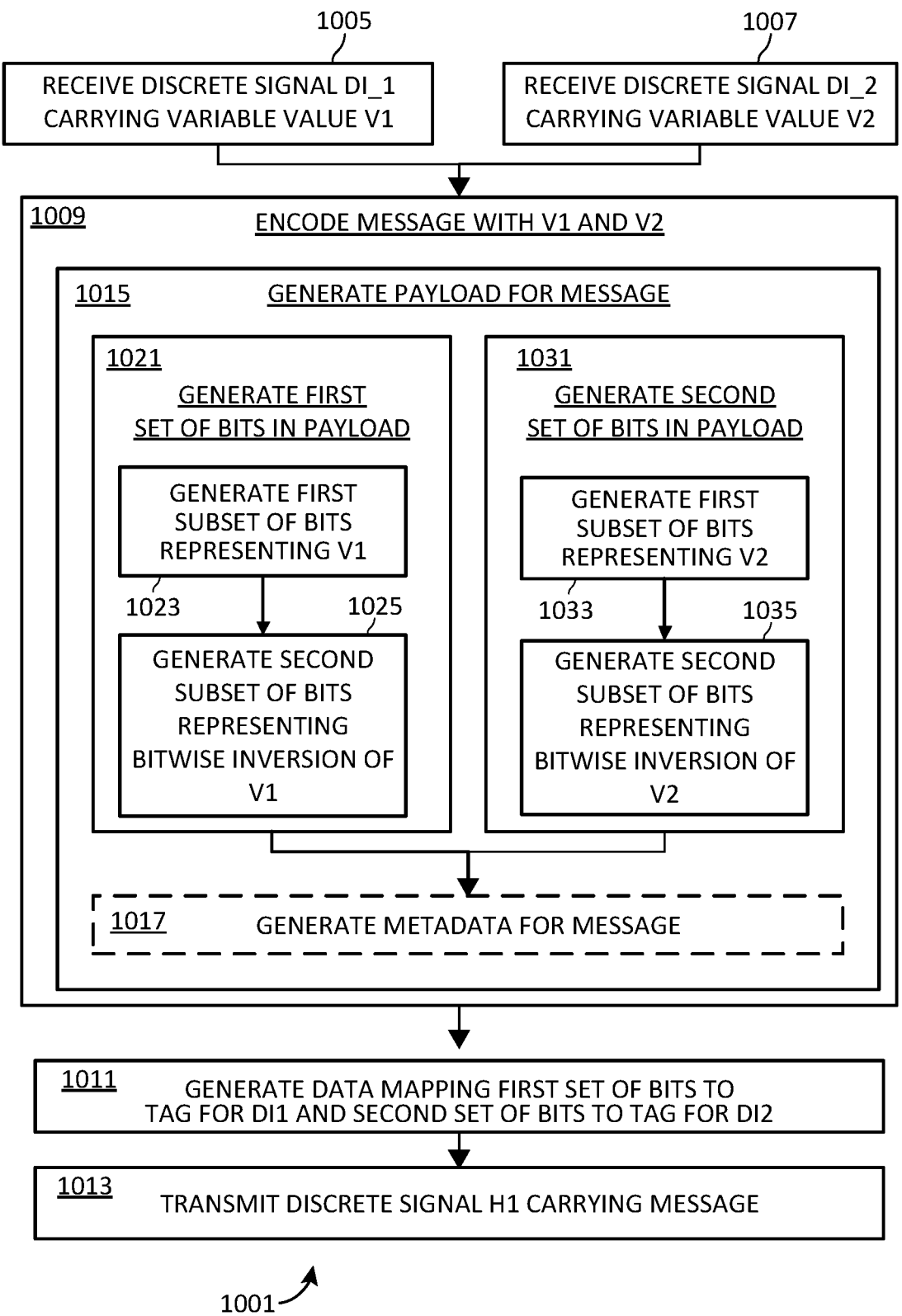
FIG. 10A is a flow chart of an example method of encoding a message according to the protocol shown in FIG. 9B, which may be implemented by the DIO CHARM and/or the field module shown in FIG. 3.
Figure 10B:
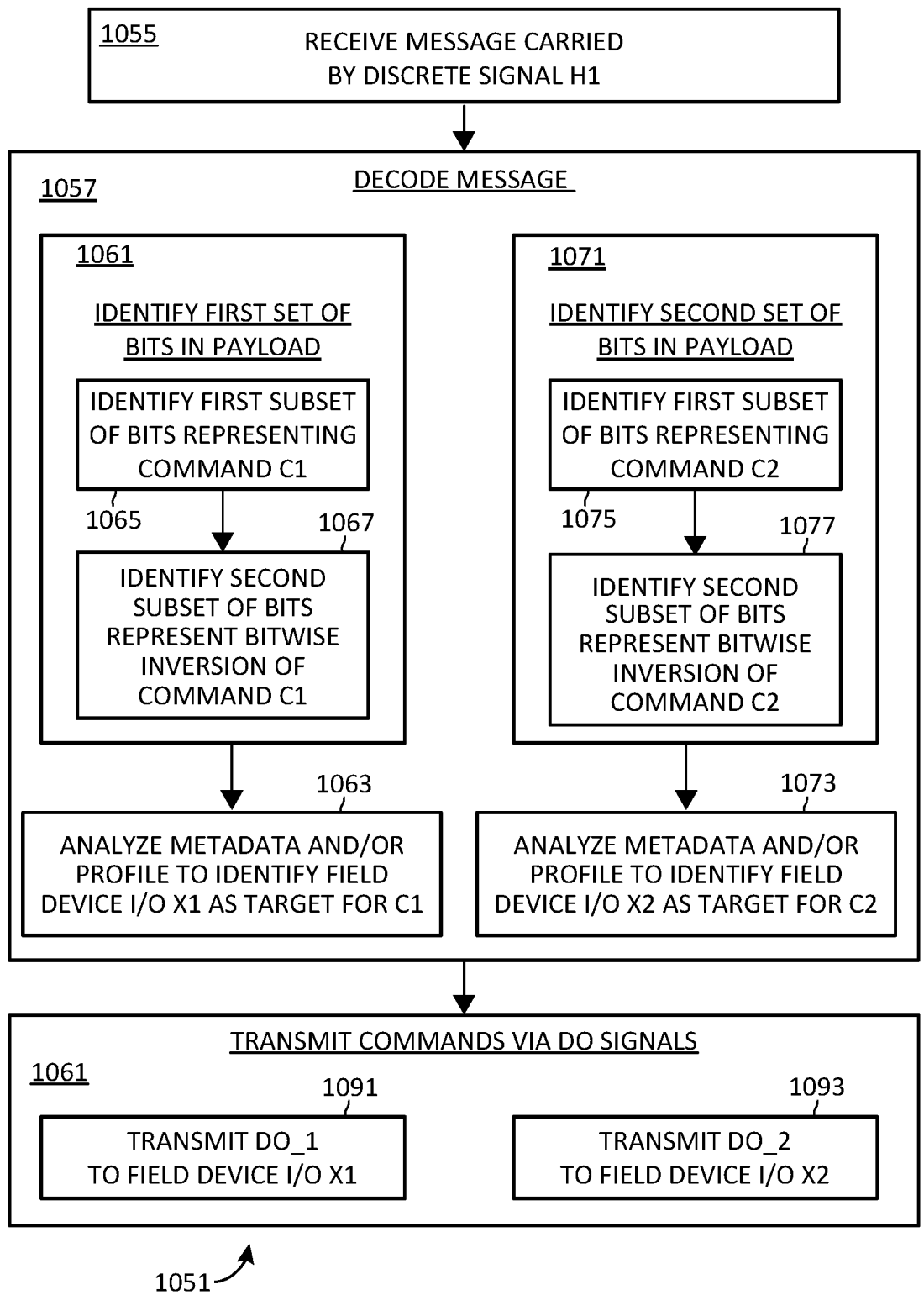
FIG. 10B is a flow chart of an example method of decoding a message according to the protocol shown in FIG. 10A, which may be implemented by the DIO CHARM and/or the field module shown in FIG. 3.

FIGS. 9A and 9B depict example data or communication signals 910 and 920 that may be carried by the channel 282 shown in FIG. 3 and that may be encoded, decoded, transmitted, or received by systems described herein (including the CHARM 293M and the field module 291 shown in FIG. 3) according to a protocol 912 and a protocol 922 respectively. FIGS. 10A and 10B depict an example method 1001 for encoding a message according to the protocol 922 and a method 1051 for decoding a message according to the protocol 922, respectively.

A. The Protocols 912 and 922

Referencing FIG. 9B, the signal 920 conforms to a novel bitwise discrete I/O communications protocol 922 (more generally referred to herein as the "DIO protocol") offering a number of advantages over the protocol 912 to which the signal 910 conforms. Specifically, relative to the protocol 912, the protocol 922 offers improved error detection and more stable DC levels on the channel 282.

As shown, each of the signals 910 and 920 carries a payload portion of a message sent by the CHARM 293M to the field module 291 via the channel 282. While the payloads carried by the signals 910 and 920 carry the same information content (e.g., the same variable values), the payload carried by the signal 910 is encoded and decoded according to the protocol 912 and the payload carried by the signal 920 is encoded and decoded according to the DIO protocol 922. The signals 910 and 920 may be encoded by the DIO CHARM 293M, the I/O card 256, or some combination thereof.

FIG. 9A shows a portion of the signal 910 corresponding to the payload portion of the message carried by the signal 910, and shows eight samples of the signal 910 occurring at times t1-t8. The payload carries information representing eight bits corresponding to eight discrete output values 914 for DO_1-DO_8: "0101 1111." The eight DO values 914 are initially generated by the controller 258 and transmitted to the I/O card 256, which forwards the values to the CHARM 293M (e.g., via a backplane). The CHARM 293M then encodes the DO values onto a message and transmits the message via the channel 282. As shown, the protocol 912 is a non-return-to-zero protocol relying on amplitude modulation in which a bit value of "1" is represented by a voltage of +5V and in which a bit value of "0" is represented by a voltage of +1V. In some cases, the protocol 910 may rely on different amplitudes to represent the values (e.g., 0V and 5V, −5V and 5V, etc.). While FIG. 9A shows the communication signal 910 superimposed on 24V DC power (e.g., sourced from the backplane of the apparatus 140, shown in FIG. 5, to which the CHARM 293M is connected), in some cases the channel 282 may carry the signal 910 but provide no power.

Referencing FIG. 9B, the protocol 922 offers a number of advantages over the protocol 912. The protocol 922 requires a set of data to be encoded by sending: (i) a first subset of bits representing a first discrete input or output variable value, and (ii) a second subset of bits representing a bitwise inversion of the first variable value. Every variable value transmitted according to the protocol 922 is similarly represented by a first subset of one or more bits representing the value and a second subset of one or more bits representing a bitwise inversion of the value.

For example, during operation, the CHARM 293M encodes the message with the value for DO_1 by setting a first bit to "0" (as shown at t1) and setting a second bit to the inverse of DO_1's value, "1" (as shown at t2). This first set of bits represents the value of DO_1. The CHARM 293M performs a similar operation for each of the other values 924. The field module 293M receives the signal 920 and decodes the message by identifying each set of bits for each of the values 924 (e.g., the first two bits correspond to DO_1; the second two bits correspond to DO_2; etc.) and verifying that the second bit or subset within the bit represents a bitwise inversion of the first bit or first subset.

Advantageously, the protocol 922 gives the signal 920 high integrity, as single and multi-bit errors may be detected at the encoding level. For example, the field module 291 or CHARM 293M will detect an error when a second subset of bits carried by the signal 920 does not represent a bitwise inversion of the first subset of bits. Further, the protocol 922 results in less change in the DC level on the channel 282. Referencing FIG. 9A, the protocol 912 can cause the DC level to remain artificially high or low for a period of time. By contrast, by the inverting process required by the protocol 922 results in a more stable DC level over time. Further, in cases where the protocol uses positive and negative voltages for amplitude modulation (e.g., +5V and −5V), the DC level will on average remain near the designed power level (e.g., 24V).

The payload carried by each of the signals 910 and 920 may be preceded and/or succeeded by a metadata portion (e.g., a header and/or a trailer) carrying: (i) payload information such as payload length, variable identifiers (e.g., DSTs representing each of DO_1-DO_8), variable mapping (e.g., indicating the bit position within the payload for each variable), variable length (e.g., in some instances certain variables may be non-binary and thus represented by more than one bit), etc.; (ii) routing information such as one or more tags, hardware addresses, or network addresses representing a destination for the message (e.g., the field module 291), destinations for the variable values carried in the payload (e.g., the connector I/O 273 of the field device 252k), a source of the message (e.g., the CHARM 293M and/or the controller 258), and/or any intermediary nodes used to route the message to the destination (e.g., the I/O card 256 and/or the CHARM 293M); (iii) error detection and correction information, such as a checksum, parity bits, and/or cyclic redundancy checks (CRC); (iv) protocol information identifying the type of protocol used for the messaging; and/or (v) a preamble, a start code, and/or an end code enabling sending and receiving devices to identify the beginning of a new message, map bit positions to appropriate variables, and/or identify the end of a message.

While FIGS. 9A and 9B show the signals 910 and 920 carrying only binary variable values, in some instances the protocols 910 and 920 enable encoding and decoding of non-binary values. For example, hexadecimal may be used, wherein a first set of 16 bits represents a first value, a second set of 16 bits represents a second value, etc. As another example, binary coded decimal (BCD) may be utilized, wherein each variable value is characterized by one or more bytes or half-bytes, each representing a decimal digit. When BCD is used, the message metadata or field module profile may store a mapping of each byte or half-byte to a particular variable and to a particular digit for that variable. For example, a two digit BCD value for a tank level may be represented by a first set of 8 bits for the first digit of the level value and a second set of 8 bits for the second digit of the level value.

In some embodiments, the system 5 and, in particular, the CHARM 293M and the field module 291, may rely on different encoding and decoding protocols for signals transmitted and received via the channel 282, such as Manchester encoding. Note, however, that Manchester encoding has disadvantages. For example, with Manchester encoding, the data rate is cut in half relative to the bandwidth of the data signal. A Manchester-encoded signal needs a transition for every bit, which means two Manchester logic states are used to convey one standard logic state. Thus, twice as much bandwidth is needed to transfer data at the same rate. Further, Manchester encoding is self-clocking and thus requires clock recovery from the signal when the signal is decoded. The protocol 922 does not require that a clock be embedded within the signal 920 and thus does not require clock recovery from the signal during decoding.

In some cases, the plant 5 may implement additional or alternative techniques. For example, in some cases, the plant 5 implements a protocol that uses the same general coding techniques of one of the protocols 912 or 922, but that relies on return-to-zero (RTZ) coding wherein the signal drops to zero between pulses and/or that relies on transitions between voltage levels to indicate value rather than constant voltage levels. Further, if desired, the plant 5 may implement a protocol that uses the same general coding techniques of one of the protocols 912 or 922, but that modulates the frequency of or phase of the signal to indicate value rather than the amplitude of the signal.

B. Encoding a Message According to the Protocol 522

FIG. 10A is a flow chart of an example method 1001 of encoding a message according to the protocol 922 that may be implemented by the CHARM 293M and/or the field module 291 shown in FIG. 3. The method 1001 offers improved error detection and stable DC levels on channels that provide power and discrete communications.

At a high level, the method 1001 includes four steps: a DI signal receiving step 1005/1007; a message encoding step 1009; a message mapping step 1011; and a message transmission step 1013.

At steps 1005 and 1007, discrete signals DI_1 and DI_2 carrying variable values V1 and V2, respectively, are received. For example, with reference to FIG. 3, the field module 291 may receive D1_1 via the subchannel to the field device connector 276, and may receive DI_2 via a subchannel to a second field device connector (not shown).

After receiving the discrete signals, the field module 291 decodes the signals (e.g., based on the voltage of the subchannels) and encodes a message at step 1009. Because the encoded message generally carries values for variables corresponding to DI signals in the process plant (e.g., from the I/O connector 276 of the field device 252K shown in FIG. 3), the encoded message is sometimes referred to as a "DI message." However, it will be noted that a message may be encoded via the protocol 922 with information not corresponding to DI signals from field devices (e.g., an index value generated by the field module 291 or a value corresponding to a DO signal). In any event, the step 1009 includes a substep 1015 in which the payload for the DI message is generated and a substep 1017 in which metadata for the DI message is generated.

At the substep 1015, a set of bits is generated for each of the values V1 (substep 1021) and V2 (substep 1031). In particular, for V1, a first subset of bits representing V1 is generated (substep 1023) and a second subset of bits representing a bitwise inversion of V1 is generated (substep 1025). Similarly, for V2, a first subset of bits representing V2 is generated (substep 1033) and a second subset of bits representing a bitwise inversion of V2 is generated (substep 1035). The field module 291 may verify that every second subset represents a bitwise inversion of the value represented by the first subset of bits. If this is not the case, the field module 291 may transmit an error signal to the CHARM 293M to notify the CHARM 293M that an encoding error has occurred. In any event, assuming no errors are detected, each of the sets of bits is encoded to a bit position within the payload of the message.

Regarding substep 1017, example metadata was previously described with reference to FIGS. 9A and 9B. The metadata may indicate the start and/or end of the DI message (e.g., via a particular start code or end code unique to the protocol 922). In some cases, very little or no metadata may be generated for the DI message.

At the step 1011, a tag-to-message map may be generated. The control system 5 may have unique tags for each of the DI_1 and the DI_2, each representing a variable (e.g., a control valve status). The tag-to-message map identifies the bit position(s) within the DI message for each tag corresponding to the DIs. Note, the step 1011 may occur before any of the other steps in the method 1001, and may be stored to the profile 291F shown in FIG. 3, which may then be uploaded to the CHARM 293M, the I/O card 256, the controller 258, and/or other devices in the plant 5. In some cases, the map is included in the metadata that is generated at step 1017.

At the step 1013, the field module 291 transmits a discrete signal H1, via the I/O channel 282, carrying the DI message, which may be received and decoded by the CHARM 293M. Note, the "H1" label for the transmitted discrete signal has no significance other than to make clear that the signal H1 is distinct from the discrete signals DI_1 and DI_2. The field modules 291 transmits the signal H1 via the interface 291H and the channel 282 to the CHARM 293M, and receives the signals DI_1 and DI_2 via two channels individually wired to the interface 291G.

Note, while the step 1009 shown in FIG. 10A shows substeps for a field module 291 encoding a DI message carrying variable values, the substeps of step 1009 may similarly be utilized by any suitable device (e.g., the CHARM 293M) to encode a message carrying any desired information. Generally speaking, rather than encoding variable values received via field device subchannels, the CHARM 293M encodes to a message commands received via the I/O card 256 and the controller 258. The CHARM 293M transmits this "DO message" via the channel 282 so that it can be received and decoded by the field module 291, which then transmits the commands to the appropriate field devices via I/O subchannels.

C. Decoding a Message According to the Protocol 922

FIG. 10B is a flow chart of an example method 1051 of decoding a message according to the protocol 922 that may be implemented by the CHARM 293M and/or the field module 291 shown in FIG. 3. The method 1051 offers improved error detection and stable DC levels on channels that provide power and discrete communications.

At a high level, the method 1051 includes four steps: a message receiving step 1055; a message decoding step 1057; a discrete output (DO) signal encoding step 1059; and a command transmission step 1061.

At the step 1055, the field module 291 receives a message carried by a discrete signal H1. As already noted, the "H1" label has no significance other than to distinguish the received signal from other discrete signals, such as the DO signals referenced in the steps 1059 and 1061.

At the step 1057, the field module 291 decodes the received message according to the protocol 922. Because the received message generally carries values for commands or control outputs meant to be received by field devices via DO signals (e.g., via one of the I/O connector 273-275 of the field device 252K shown in FIG. 3), the received message is sometimes referred to as a "DO message." However, it will be noted that the decoding step 1057 may be utilized to decode a message carrying any suitable information (e.g., a value corresponding to a DI signal; a command for the field module 291; etc.), so long as the message has been encoded via the protocol 922. In any event, the step 1057 includes substeps 1061 and 1071 in which sets of bits representing particular commands or other information are identified.

Specifically, at substep 1065, the field module 291 identifies, within the first set, a first subset of bits representing a command C1. At substep 1067, the field module 291 identifies, within the first set, a second subset of bits representing a bitwise inversion of the command C1. When the second subset does not represent a bitwise inversion of the first subset, the command C1 is "dropped" and a default command is instead utilized (e.g., the previously existing command or a predefined "safe" command). At the substeps 1075 and 1077, the field module 291 performs a similar operation to identify within the second set of bits a first subset of bits representing a command C2 and a second subset of bits representing a bitwise inversion of command C2.

At substeps 1063 and 1073, the field module 291 identifies target field device subchannels or I/O connectors X1 and X2, respectively, for the commands C1 and C2. The field module 291 identifies these target subchannels based on an analysis of a tag-to-message map (e.g., indicating which tags correspond to which bit positions in the message) and/or a tag-to-hardware map (e.g., indicating which tags correspond to which hardware addresses). These maps may be stored to the profile 291F, or may be included in a metadata portion of the DO message.

After the DO message has been decoded, the field module 291 transmits the commands C1 (substep 1091) and C2 (substep 1093) to the appropriate field device I/O channels X1 and X2, respectively, by encoding each signal DO_1 (carried by the channel X1) and DO_2 (carried by the channel X2) accordingly. Generally speaking, encoding the commands C1 and C2 involves simply driving the voltage of the appropriate signal to one of two levels (e.g., 5V or 1V).

Note, while the step 1057 shown in FIG. 10B shows substeps for a field module 291 decoding a DO message carrying command values, the substeps of 1057 may similarly be utilized by any suitable device (e.g., the CHARM 293M) to decode a message that has been encoded according to the protocol 922. For example, the CHARM 293M may implement the step 1057 to decode a DI message received from the field module 291 to identify a set of DI values. The CHARM 293M may then forward these DI values (and associated tags, if desired) to the I/O card 256 and/or the controller 258, enabling the controller 258 to implement control routines that account for the DI values (e.g., representing measured process variables, such as flow rates, tank levels, valve positions, pressure levels, temperatures, etc.).

VI. Other Considerations

Descriptions of various aspects, apparatuses, systems, components, devices, methods, and techniques for managing discrete process control elements (e.g., discrete devices, discrete communication channels, discrete signals, etc.) and for smart commissioning discrete elements in the control system 5 follow.

As discussed above, the smart commissioning techniques described herein significantly reduce the time, personnel, and costs of commissioning a process plant 5. As a process plant may include hundreds, thousands, and even tens of thousands of discrete elements, each of which must be commissioned before the process plant begins operation, the resource savings in person-hours (and therefore, financially) derived from the smart commissioning techniques are extensive. Moreover, because at least some of the smart commissioning techniques are automatically performed, they are less susceptible to user error and thus are more accurate than traditional commissioning techniques.

It is noted that while the smart commissioning techniques described herein are described with respect to a process control system 5, any one or more of the smart commissioning techniques described herein are equally applicable to a process control safety information system of a process control plant, such as the DeltaV SIS™ product provided by Emerson Process Management. For example, a standalone process control safety system or an integrated control and safety system ("ICSS") may be commissioned using any one or more of the smart commissioning techniques described herein.

Additionally, when implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the methods 601, 701, 851, 1001, and 1051 specifically, the described functions may be implemented, in whole or in part, by the devices, circuits, and/or routines of the system 5 shown in FIG. 1A. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or."

For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

Throughout this specification, some of the following terms and phrases are used.

Commissioning. Commissioning can be divided into at least two categories: traditional commissioning and smart commissioning. Traditional commissioning techniques require that the names or identifications of various components disposed in the field environment 122 shown in FIG. 1 as well as their associations and interconnections with other components to be defined in the back-end environment 125 before commissioning is able to begin in any significant manner in the field environment 122. That is, traditional commissioning techniques require that the names, associations, and interconnections of various field components first be configured or defined in the back-end environment 125, and then be downloaded or otherwise transmitted to the field environment 122 via established communication paths within the process control system 5 in order for such commissioning data to be available in the field environment 122 for use in commissioning components of the field environment 122. For example, using traditional commissioning techniques, commissioning data (including configurations and definitions) typically is transmitted, via the data highway 10, from the back-end environment 125 to a controller 120 and I/O devices 108, and in some cases to field devices 102 in the field environment 122, so that the commissioning data is available for use in performing one or more commissioning actions or activities in the field environment 122.

On the other hand, smart commissioning does not require configuration and definition to be entirely completed at the back-end environment 125 prior to initiating commissioning activities in the field environment 122. Instead, the smart commissioning techniques described herein allow for the physical design, installation, engineering, and commissioning to be initiated and performed in the field environment 122 of the process plant 5 independently of the progress of the functional/logical design and engineering being performed in the back-end environment 125 of the process plant. For example, various commissioning activities or actions may be performed in the field environment 122 of the process plant 5 prior to the field environment 122 being communicatively connected to the back-end environment 125 of the process plant 5, e.g. while the field environment 122 and the back-end environment 125 are communicatively disconnected, and/or while a loop 100 (or portion thereof) that has been installed in the field environment 122 is communicatively disconnected from the back-end environment 125.

For instance, at least some portion of the commissioning activities and actions may be performed in the field environment 122 prior to the process control system or plant 5 having knowledge of the assignment of a field device to a particular I/O card and/or I/O channel. Additionally or alternatively, various commissioning activities or actions may be formed on various components of a process control loop while the various components are disconnected from other components of the process control loop and/or while various components are not yet allocated to other components of the loop. Accordingly, smart commissioning allows at least some portions of the commissioning process to be performed locally, automatically, distributively, and/or in parallel so that devices, components, and other portions of a process plant 5 may be partially or even entirely commissioned prior to being incorporated or integrated into the plant or system 5 as a whole, thereby significantly reducing time, personnel, and costs needed for commissioning the process plant as compared to traditional commissioning techniques.

Communication Interface: Some of the described devices and/or systems include a "communication interface" (sometimes referred to as a "network interface"). For example, the device 806 includes the communication interface 806. A communication interface such as the interface 806 enables the system to send information to other systems and to receive information from other systems, and may include circuitry for wired and/or wireless communication.

Referencing the device 801 and FIG. 8, the communication interface 806 enables the device 801 to connect to the field module 291 and/or to other computing systems or servers via any suitable network, such as a personal area network (PAN), a local area network (LAN), or a wide area network (WAN). In particular, the communication interface 806 includes circuitry for wirelessly connecting the device 801 to the field module 291 in accordance with protocols and standards for NFC (operating in the 13.56 MHz band), RFID (operating in frequency bands of 125-134 kHz, 13.56 MHz, and/or 856 MHz to 960 MHz), Bluetooth (operating in a band of 2.4 to 2.485 GHZ), Wi-Fi Direct (operating in a band of 2.4 GHz or 5 GHz), and/or any other suitable communications protocol or standard that enables wireless communication.

Communication Link. A "communication link" or "link" is a pathway or medium connecting two or more nodes. A link may be a physical link and/or a logical link. A physical link is the interface and/or medium(s) over which information is transferred, and may be wired or wireless in nature. Examples of physicals links may include a cable with a conductor for transmission of electrical energy, a fiber optic connection for transmission of light, and/or a wireless electromagnetic signal that carries information via changes made to one or more properties of an electromagnetic wave(s).

A logical link between two or more nodes represents an abstraction of the underlying physical links and/or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media. Generally speaking, as used herein the phrase "memory" or "memory device" refers to a system or device including computer-readable media ("CRM"). "CRM" refers to a medium or media accessible by the relevant computing system for placing, keeping, and/or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile and/or nonvolatile media, and removable and/or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network. As used herein and unless otherwise specified, when used in the context of system(s) or device(s) that communicate information or data, the term "network" refers to a collection of nodes (e.g., devices or systems capable of sending, receiving and/or forwarding information) and links which are connected to enable telecommunication between the nodes.

A network may include dedicated routers responsible for directing traffic between nodes, and, optionally, dedicated devices responsible for configuring and managing the network. Some or all of the nodes may be also adapted to function as routers in order to direct traffic sent between other network devices. Network devices may be interconnected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. A network may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving and/or forwarding information. For example, end-devices or end-systems that originate and/or ultimately receive a message are nodes. Intermediary devices that receive and forward the message (e.g., between two end-devices) are also generally considered to be "nodes."

Processor. The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller and/or an I/O controller. A chipset is a collection of electronic components in an integrated circuit that is typically configured to provide I/O and memory management functions as well as a plurality of general purpose and/or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

What is claimed:

1. A signal characterization component including:
a first communication interface configured for connection to a first channel that couples the signal characterization component to a process controller;
a second communication interface configured for connection to a second channel that couples the signal characterization component to a process control device, wherein the process control device is coupled to a plurality of discrete I/O channels for one or more field devices;
one or more circuits communicatively coupled to the first communication interface and the second communication interface, the one or more circuits configured to: (i) transmit, via the second channel, a discrete-output (DO) message encoded with one or more commands for one or more discrete outputs received via the first channel; and (ii) transmit, via the first channel, one or more sets of information for one or more discrete inputs decoded from a discrete-input (DI) message received via the second channel,
wherein the signal characterization component is external to a housing of an I/O card for the process controller and is configured for bidirectional communication with the process control device by transmitting discrete outputs to the process control device and receiving discrete inputs from the process control device via a single communication channel which is a discrete input and output (DIO) communication channel.

2. The signal characterization component of claim 1, wherein the second channel is configured to supply power to the process control device that is sourced from a power supply external to the signal characterization module.

3. The signal characterization component of claim 1, wherein the one or more circuits are further configured to provide power to the second channel sufficient to enable the second channel to supply power to the process control device.

4. The signal characterization component of claim 3, wherein the first channel is a powered communication bus and wherein the power provided to the second channel is sourced from the first channel.

5. The signal characterization component of claim 4, wherein the powered communication bus is connected to an I/O card that is communicatively coupled to the process controller.

6. The signal characterization component of claim 1, wherein the one or more commands includes at least a first command and a second command,
wherein for the first command, the DO message is encoded with a first set of bits including a first subset of bits representing the first command and a second subset of bits representing a bitwise inversion of the first command; and
wherein for the second command, the DO message is encoded with a second set of bits including a third subset of bits representing the second command and a fourth subset of bits representing a bitwise inversion of the second command.

7. The signal characterization component of claim 1, wherein the one or more circuits are further configured to:
autosense a device tag for the process control device; and
transmit the device tag via the first channel so that tag can be bound to the process control device.

8. The signal characterization component of claim 1, wherein the one or more circuits are further configured to:
autosense a signal tag for each of the plurality of discrete I/O channels connected to the process control device; and
transmit the signal tags via the first channel so that the signal tags can be bound to hardware addresses for the discrete I/O channels.

9. The signal characterization component of claim 1, further including a housing for the one or more circuits that: (i) is shaped for insertion into a socket of an electronic marshalling apparatus, and (ii) enables, upon insertion, a communicative connection of the first communication interface to the first channel and a communicative connection of the second communication interface to the second channel.

10. A method for signal characterization enabling a process controller to control field devices configured to receive discrete output (DO) signals via input/output (I/O) channels, the method comprising:
(A) receiving, at a signal characterization component and via a first channel, one or more commands for one or more discrete outputs transmitted by the process controller;
(B) encoding a DO message with the one or more commands;
(C) transmitting the DO message, by the signal characterization component and via a second channel, to a process control device configured for:
(i) receiving the DO message via the second channel;
(ii) decoding the DO message to identify the one or more commands; and
(iii) transmitting the one or more commands, via a plurality of discrete I/O channels, to one or more field devices,
wherein the signal characterization component is external to a housing of an I/O card for the process controller and is configured for bidirectional communication with the process control device by transmitting discrete outputs to the process control device and receiving discrete inputs from the process control device via a single communication channel which is a discrete input and output (DIO) communication channel.

11. The method of claim 10, further comprising providing power to the second channel sufficient to power to the process control device via the second channel.

12. The method of claim 11, wherein the first channel is a powered communication bus,
wherein the power provided to the second channel is sourced by the signal characterization component from the first channel.

13. The method of claim 12, wherein the powered communication bus is connected to an I/O card that is communicatively coupled to the process controller.

14. The method of claim 13, wherein the one or more commands includes at least a first command and a second command, and wherein encoding the DO message with the one or more commands comprises:

for the first command, encoding the DO message with a first set of bits including a first subset of bits representing the first command and a second subset of bits representing a bitwise inversion of the first command; and for the second command, encoding the DO message with a second set of bits including third subset of bits representing the second command and a fourth subset of bits representing a bitwise inversion of the second command.

15. The method of claim 10, further comprising:
autosensing a device tag for the process control device; and
transmitting the device tag via the first channel so that tag can be bound to the process control device.

16. The method of claim 10, further comprising:
autosensing a signal tag for each of the plurality of discrete I/O channels connected to the process control device; and
transmitting the signal tags via the first channel so that the signal tags can be bound to hardware addresses for the discrete I/O channels.

17. The method of claim 10, further comprising:
before receiving the one or more commands transmitted by the process controller, inserting the signal characterization component into a socket of an electronic marshalling apparatus such that the signal characterization component physically interfaces with the first and second channels to thereby enable communication by the signal characterization component via the first and second channels.

18. The method of claim 10, further comprising:
before receiving the one or more commands transmitted by the process controller, inserting the signal characterization component into a socket of an electronic marshalling apparatus such that the signal characterization component wirelessly interfaces with the first and second channels to thereby enable communication by the signal characterization component via the first and second channels.

19. A method for signal characterization enabling a process controller to receive information that is carried by discrete input (DI) signals transmitted by field devices via input/output (I/O) channels the method comprising:
(A) receiving, at a signal characterization component via a first channel, a DI message transmitted by a process control device configured for:
(i) receiving, via a plurality of discrete I/O channels to one or more field devices, a plurality of DI signals carrying one or more sets of information;
(ii) encoding the DI message with the one or more sets of information based on the plurality of DI signals; and
(iii) transmitting the DI message via the first channel;
(B) decoding, by the signal characterization component, the DI message to identify the one or more sets of information; and
(C) transmitting, by the signal characterization component, the one or more sets of information, via a second channel, to a process controller so that the process controller can implement control of a process based, at least in part, on the one or more sets of information,
wherein the signal characterization component is external to a housing of an I/O card for the process controller and is configured for bidirectional communication with the process control device by transmitting discrete outputs to the process control device and receiving discrete inputs from the process control device via a single communication channel which is a discrete input and output (DIO) communication channel.

20. The method of claim 19, further comprising providing power to the second channel sufficient to power the process control device via the second channel.

21. The method of claim 20, wherein the first channel is a powered communication bus,
wherein the power provided to the second channel is sourced by the signal characterization component from the first channel.

22. The method of claim 21, wherein the powered communication bus is connected to an I/O card that is communicatively coupled to the process controller.

23. The method of claim 19, wherein the one or more sets of information includes at least a first set of information and a second set of information, and wherein decoding the DI message comprises:
for the first set of information: (i) identifying a first set of bits within the DI message including a first subset of bits and a second subset of bits; (ii) identifying a value that the first subset of bits represents; and (iii) verifying that the second subset of bits represents a bitwise inversion of the first subset of bits;
for the second set of information: (i) identifying a second set of bits within the DI message including a third subset of bits and a fourth subset of bits; (ii) identifying a value that the third subset of bits represents; and (iii) verifying that the fourth subset of bits represents a bitwise inversion of the third subset of bits.

24. The method of claim 19, wherein decoding the DI message comprises:
for a particular set of information in the DI message: (i) identifying a set of bits within the DI message corresponding to the particular set of information, the set of bits including a first subset of bits and a second subset of bits; (ii) determining that the second subset of bits does not represent a bitwise inversion of the first subset of bit; (iii) generating an error indicating that the particular set of information was not properly encoded onto the DI message.

25. The method of claim 19, further comprising:
autosensing a device tag for the process control device; and
transmitting the device tag via the first channel so that the device tag can be bound to the process control device.

26. The method of claim 25, further comprising:
autosensing a signal tag for each of the plurality of discrete I/O channels connected to the process control device; and
transmitting the signal tags via the first channel so that the signal tags can be bound to hardware addresses for the discrete I/O channels.

* * * * *